(12) United States Patent
Masoud et al.

(10) Patent No.: US 11,878,595 B2
(45) Date of Patent: Jan. 23, 2024

(54) VEHICLE-TO-VEHICLE POWER TRANSFER SYSTEM

(71) Applicant: THE REGENTS OF THE UNIVERSITY OF MICHIGAN, Ann Arbor, MI (US)

(72) Inventors: Neda Masoud, Dexter, MI (US); Al-Thaddeus Avestruz, Ann Arbor, MI (US); Chinedum E. Okwudire, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/056,322

(22) PCT Filed: May 21, 2019

(86) PCT No.: PCT/US2019/033277
§ 371 (c)(1),
(2) Date: Nov. 17, 2020

(87) PCT Pub. No.: WO2019/226630
PCT Pub. Date: Nov. 28, 2019

(65) Prior Publication Data
US 2021/0291692 A1      Sep. 23, 2021

Related U.S. Application Data

(60) Provisional application No. 62/674,065, filed on May 21, 2018.

(51) Int. Cl.
*B60L 53/12*      (2019.01)
*H02J 50/05*      (2016.01)
(Continued)

(52) U.S. Cl.
CPC ............. *B60L 53/12* (2019.02); *B60L 53/14* (2019.02); *B60L 53/53* (2019.02); *B60L 53/665* (2019.02);
(Continued)

(58) Field of Classification Search
CPC ........ B60L 53/665; B60L 53/12; B60L 53/14; B60L 53/53; H02J 7/342; H02J 50/05; H02J 50/10
(Continued)

(56) References Cited

U.S. PATENT DOCUMENTS 8,860,362 B2 * 10/2014 Kamen ................. B60L 53/305
                                                                320/109
9,754,300 B2 *  9/2017 Kempton ................ H02J 3/38
(Continued)

FOREIGN PATENT DOCUMENTS

| JP | H1051960 A | 2/1998 |
|---|---|---|
| JP | 2015-177632 A | 10/2015 |
| KR | 10-2017-0045908 A | 4/2017 |

OTHER PUBLICATIONS

International Search Report and Written Opinion of the International Searching Authority issued in PCT/US2019/033277, dated Sep. 18, 2019; ISA/US.

*Primary Examiner* — Richard Isla
*Assistant Examiner* — Manuel Hernandez
(74) *Attorney, Agent, or Firm* — Harness, Dickey & Pierce, P.L.C.

(57) ABSTRACT

A vehicle-to-vehicle power transfer system for use between a first vehicle and at least a second vehicle. The system includes an electric power system disposed in each of the first and second vehicles configured to provide electrical drive power to a vehicle drive system for propulsion of the associated vehicle and a power transfer system configured to (Continued)

transfer electric power from at least the electric power system of the first vehicle to the electric power system of the second vehicle while the vehicles are in motion or stationary.

19 Claims, 18 Drawing Sheets

(51) Int. Cl.
  *B60L 53/14* (2019.01)
  *B60L 53/66* (2019.01)
  *H02J 50/10* (2016.01)
  *H02J 7/34* (2006.01)
  *B60L 53/53* (2019.01)

(52) U.S. Cl.
  CPC .............. *H02J 7/342* (2020.01); *H02J 50/05* (2016.02); *H02J 50/10* (2016.02)

(58) Field of Classification Search
  USPC ......................................... 320/103, 104, 108
  See application file for complete search history.

(56) References Cited

U.S. PATENT DOCUMENTS

| | | | |
|---|---|---|---|
| 9,778,653 B1 * | 10/2017 | McClintock | B67D 7/348 |
| 9,873,408 B2 * | 1/2018 | Capizzo | F17C 1/00 |
| 9,944,192 B2 * | 4/2018 | Ricci | H02J 7/025 |
| 10,340,709 B2 * | 7/2019 | Dyer | B60L 53/55 |
| 10,468,897 B2 * | 11/2019 | Fan | B60L 15/42 |
| 2009/0045773 A1 * | 2/2009 | Pandya | B60L 53/00 320/108 |
| 2011/0254379 A1 * | 10/2011 | Madawala | H02M 3/33584 307/104 |
| 2013/0020993 A1 * | 1/2013 | Taddeo | B60L 53/16 320/109 |
| 2015/0229157 A1 * | 8/2015 | Lin | H02J 50/70 320/108 |
| 2016/0068070 A1 * | 3/2016 | Huang | B60L 53/39 320/108 |
| 2016/0129793 A1 * | 5/2016 | Cronie | B60L 53/126 320/109 |
| 2016/0200208 A1 * | 7/2016 | Faye | B60L 53/68 320/109 |
| 2016/0236583 A1 * | 8/2016 | Kamen | B60L 55/00 |
| 2016/0250941 A1 * | 9/2016 | O'Connell | B60L 1/02 320/104 |
| 2017/0050529 A1 | 2/2017 | Lambert et al. | |
| 2017/0136894 A1 | 5/2017 | Ricci | |
| 2019/0047433 A1 * | 2/2019 | Rozman | B60L 58/12 |
| 2020/0014247 A1 * | 1/2020 | Avestruz | H02J 50/40 |
| 2021/0323420 A1 * | 10/2021 | Lu | H02J 7/00032 |

* cited by examiner

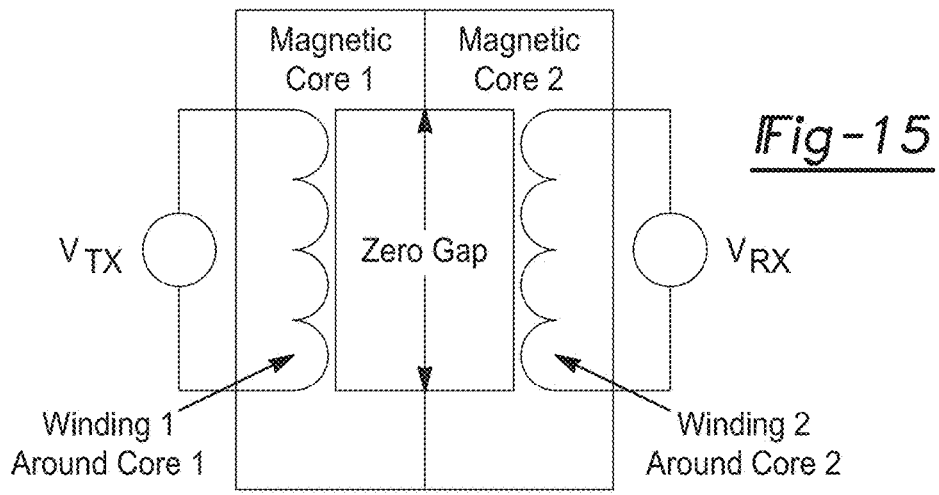
*Fig-15*
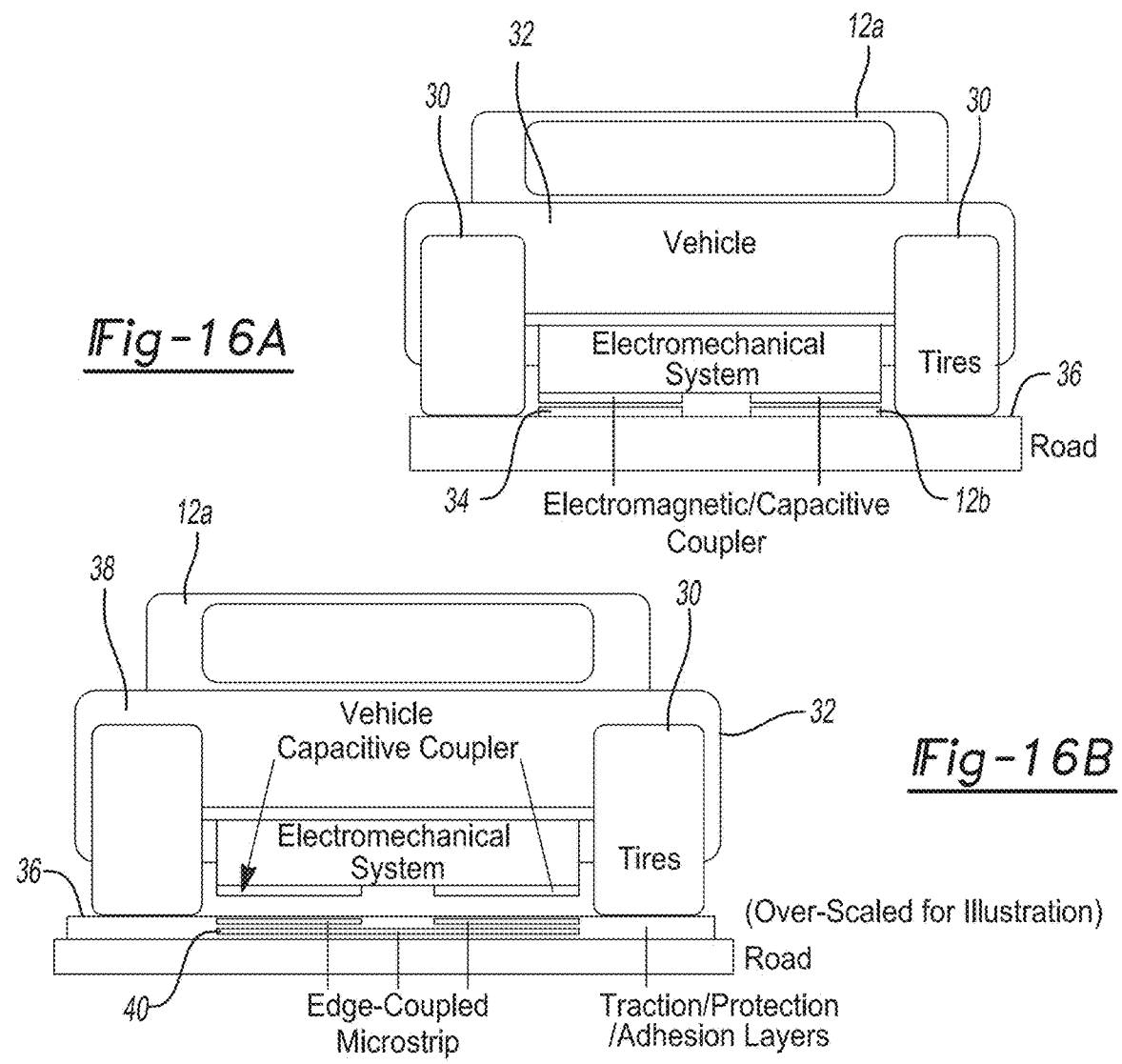
*Fig-16A*
*Fig-16B*

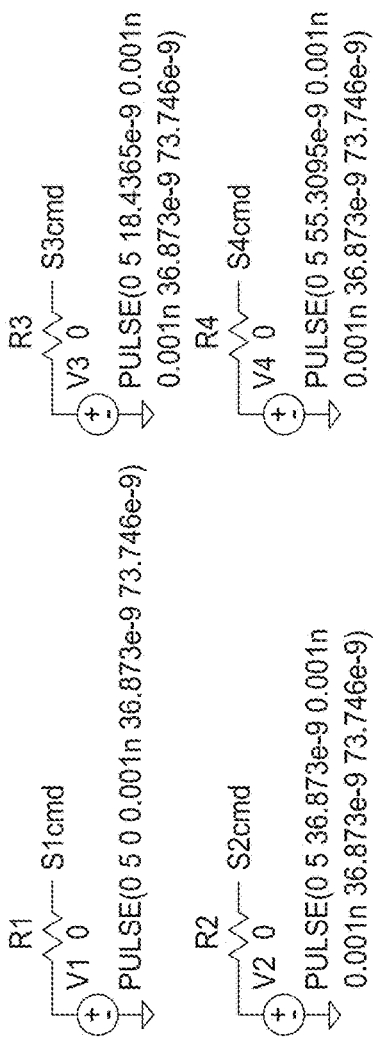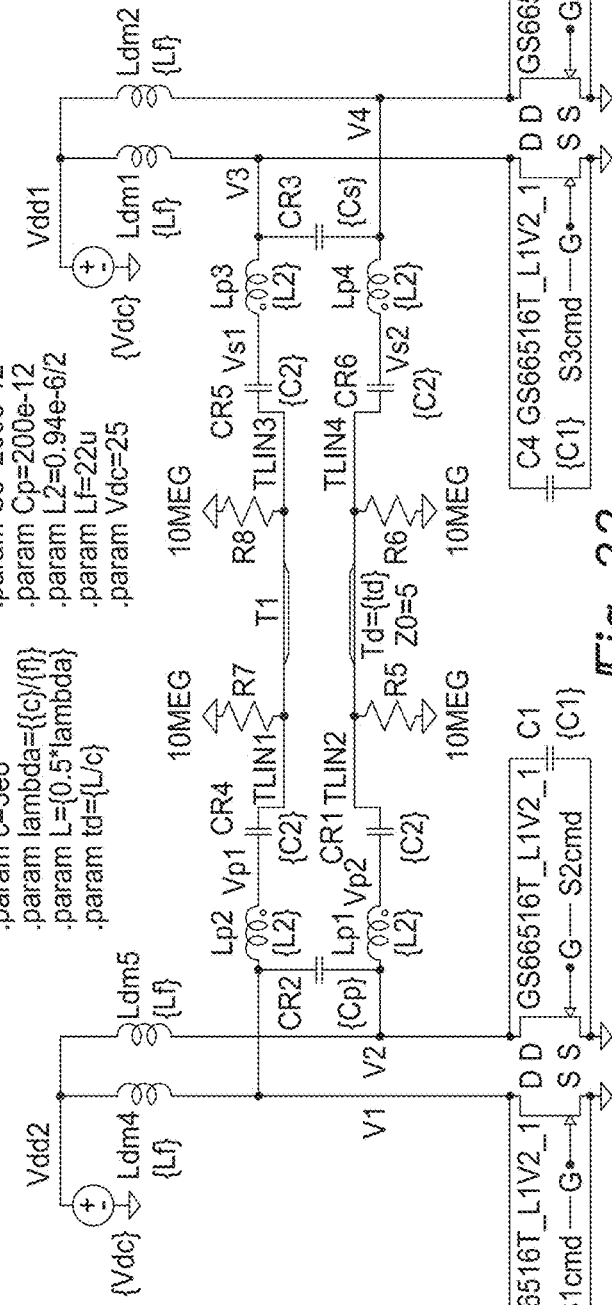
Fig-22

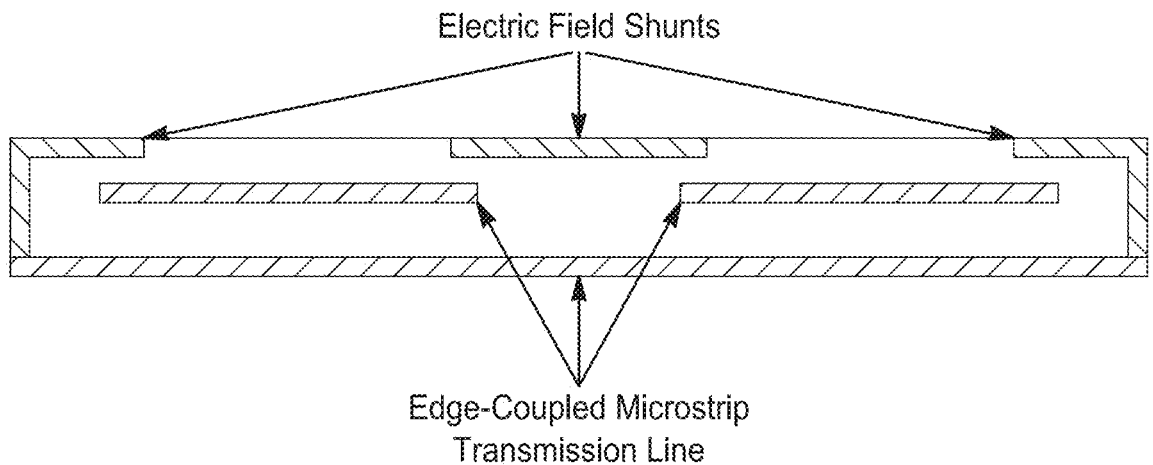
*Fig-24*
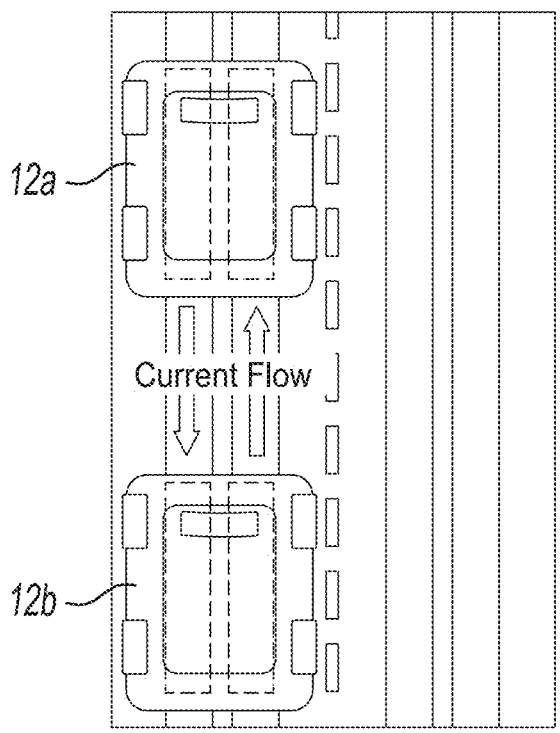 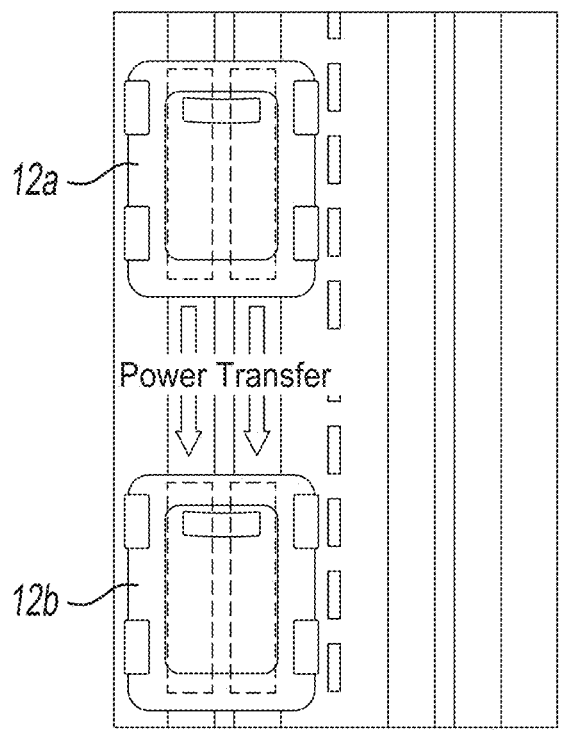
*Fig-25A*  *Fig-25B*

VEHICLE-TO-VEHICLE POWER TRANSFER SYSTEM

CROSS-REFERENCE TO RELATED APPLICATIONS

This application is a 371 U.S. National Phase of International Application No. PCT/US2019/033277, filed May 21, 2019 which claims the benefit of U.S. Provisional Application 62/674,065 filed on May 21, 2018. The entire disclosures of the above applications are incorporated herein by reference.

FIELD

The present disclosure relates to a power transfer system and, more particularly, relates to a power transfer system configured to transfer electric power from the electric power system of a first device, vehicle, robot, or the like to the electric power system of a second device, vehicle, robot, or the like.

BACKGROUND AND SUMMARY

This section provides background information related to the present disclosure which is not necessarily prior art. This section provides a general summary of the disclosure, and is not a comprehensive disclosure of its full scope or all of its features.

The present teachings will be discussed primarily in the context of peer-to-peer power transfer, such as in the case of vehicle-to-vehicle power transfer. However, it should be understood that the teachings of the present invention are equally applicable to power transfer systems, such as but not limited to vehicle-to-vehicle, robot-to-robot, device-to-device, or the like. Additionally, the teachings of the present invention are applicable to power transfer systems between dissimilar peers, such as but not limited to robot-to-vehicle, device-to-robot, vehicle-to-device, and all other permutations.

With particular reference and discussion to vehicles, it should be understood that vehicle weight is one of the main factors that affect energy consumption. Heavier vehicles have greater inertia and rolling resistance, contributing to their increased energy consumption, especially in urban networks where driving involves frequent acceleration/deceleration. A considerable portion of a Plug-in Electric Vehicle's weight (EV) weight is from its battery. In the TESLA MOTOR S, for example, the battery comprises almost 30% of the total vehicle weight. Not only the battery weight, but also the structural weight needed to support the battery can be reduced by using lower-capacity batteries. Promoting EVs with smaller batteries, however, would require infrastructure investments to support frequent charging. Furthermore, multiple charging stops during longer-distance trips can become an inconvenience.

According to the principles of the present teachings, a non-contact wireless or tethered power transfer (PT) between EVs or other devices is provided to facilitate frequent, real-time, and on-demand charging of EVs or devices, based on the principle of sharing economy. In this setting, for example, vehicles who have power to spare connect to and charge their peers (i.e. peer-to-peer) who are in need of power, either enroute of their trips or in stationary settings where vehicles are parked, or stopped at intersections. The principle is similar to aerial refueling of aircraft, which allows the planes to have smaller fuel tanks, hence making them lighter, nimbler, and more fuel efficient, without the need to stop frequently for refueling. V2V PT technology enables 50% or more reduction in the battery size/weight of EVs, without the need for extensive infrastructure investments. In addition to reducing energy consumption, the present teachings can match, or even surpass, the current driving range of EVs, thereby addressing concerns regarding range anxiety of electric vehicles. It will also lead to thousands of dollars in battery cost savings.

Even only a few years ago, a discussion about V2V electric power transfer, especially while in motion, was not remotely plausible. Today, this capability is enabled by the precise vehicle coordination and alignment with small inter-vehicle gaps of Connected and Automated Vehicle (CAV) technology. With CAV technology, vehicles can drive with very small gaps between them, able to form and maintain platoons of connected vehicles that can supply power to each other. In addition, CAV technology enables vehicles traveling in adjacent lanes to engage in transfer of electric power. An electric car could be the supplier or the recipient of power from a fellow electric car or from a utility vehicle, truck, or drone as a Mobile Fast Charger (MFC)—when vehicles are parked, while stopping at an intersection or even while traveling.

Automobile manufacturers are marching forward to an all-electric zero-emissions future. For instance, General Motors (GM) is targeting an all-electric fleet by the year 2023. The appeal of battery-electric propulsion today is not only a commitment to environmentalism, but is also influenced by the prospect of autonomous cars which need to be electrified for regulatory, engineering, and practical reasons.

A well-designed V2V PT system will: (1) allow for a drastic reduction in battery size, and associated EV costs; (2) reduce energy consumption as a result of smaller vehicle weight; (3) increase the penetration rate of EVs without need for extensive infrastructure investments; (4) match, or even surpass, the current driving range of EVs, addressing concerns about the range of anxiety of EVs; and (5) unleash a sharing economy for EV charging, thus creating new business and employment opportunities.

In some embodiments, a mobile application can be used for the purchase and sale of energy between vehicles. For example, EVs can travel on the same lane of a highway paired to engage in transfer of electric power while in motion. During this transaction, a charging vehicle provides power to a receiving vehicle in need of electrical energy to complete its trip. This transfer of power is accompanied by a monetary compensation from the receiving vehicle to the charging vehicle, which can be facilitated by an online payment system through the app. The charging vehicle could be a peer EV with extra power to spare and exchange for compensation; it could also be a designated utility vehicle serving as a Mobile Fast Charger (MFC) in segments of a highway where demand for electric power is high.

Stationary charging systems for EVs have been successfully implemented, where the charger and the receiver are both stationary (traditional charging stations), or where the vehicle is in motion (designated changing lanes). These charging methods require substantial investment to deploy broadly, as shown in FIG. 2. V2V PT takes EV charging technology to the next level by (1) using an EV as the charger and (2) having both the charging and receiving vehicles at motion during the power transfer.

The paradigm of V2V power transfer holds promise to revolutionize the EV market. By shifting both the supply and the demand curves this technology can significantly increase the penetration rate of electric cars in the long run, while providing significant energy efficiency and cost saving benefits in the short run. If successful, the implications for the EV market, and by extension for the autonomous vehicle market in the future, could be significant. More specifically, this technology introduces five benefits over the existing technologies, namely, introducing energy efficiency, increasing the driving range of EVs, eliminating the need for infrastructure investments, reducing the cost of EVs, and creating a potential source of income for EV owners.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 illustrates a zero-gap separable transformer according to some embodiments of the present teachings;

FIG. 16A is a schematic view of a power transfer system between a vehicle and a roadway with an electromagnetic/capacitive coupler according to some embodiments of the present teachings;

FIG. 16B is a schematic view of a power transfer system between a vehicle and a roadway with a capacitive coupler according to some embodiments of the present teachings;

FIG. 22 is an electrical schematic of a power transfer system according to some embodiments of the present teachings;

FIG. 24 is a cross-sectional diagram illustrating addition conductor material to shunt stray electric fields in an edge-coupled transmission line of a power transfer system according to some embodiments of the present teachings;

FIG. 25A illustrates how electric current may flow during power transfer from one vehicle to another according to some embodiments of the present teachings;

FIG. 25B illustrates how electric power may flow during power transfer according to some embodiments of the present teachings;

Corresponding reference numerals indicate corresponding parts throughout the several views of the drawings.

DETAILED DESCRIPTION

Figure 1:
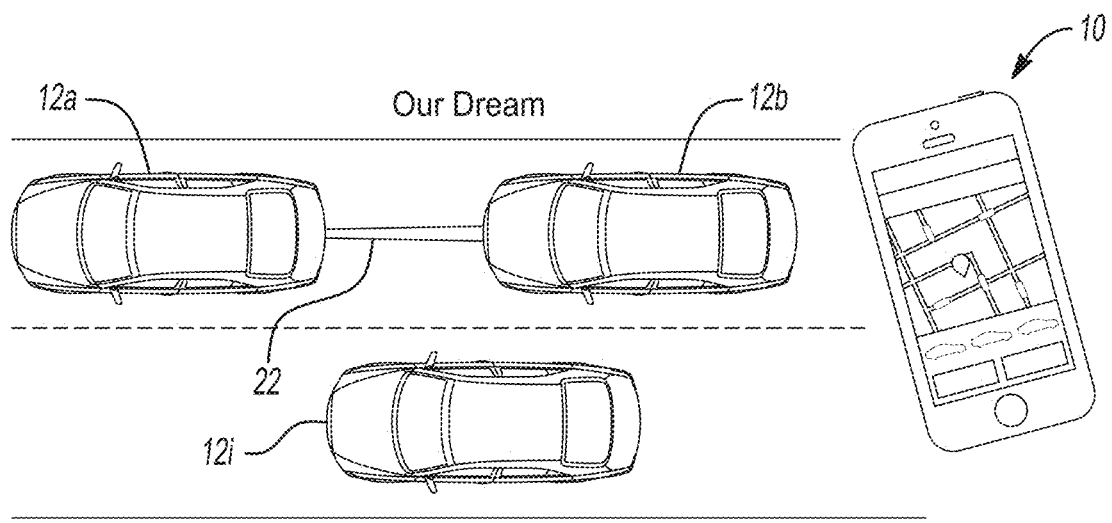
FIG. 1 is a schematic view illustrating the power transfer system and a mobile application facilitating a sharing-economy based charging paradigm according to the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A "transceiver" as used herein includes its plain and ordinary meaning, unless noted or claimed otherwise, such as, but not limited to, a device that may function as a transmitter and/or receiver at different times and/or simultaneously for the purposes of transferring power and/or information.

"Electric power" as used herein includes its plain and ordinary meaning, unless noted or claimed otherwise, such as, but not limited to, power and useful energy generated or transmitted via electric fields, magnetic fields, electromagnetic fields, acoustic, vibration, optical, photons, and/or pressure.

"Power transfer" or "power transfer system" as used herein includes their plain and ordinary meaning, such as, but not limited to, the transfer of electric power and/or information, unless noted or claimed otherwise, which can be transferred at different times and/or simultaneously from one device to another device. It should be understood that the same power transfer medium may be used by additional devices whose purpose is solely to transfer information.

Wireless charging of electric vehicles has been widely demonstrated, transferring energy through electric (capacitive) or magnetic (inductive) fields, where the state of the art is energy transfer from a stationary charging station to a single vehicle.

As illustrated in FIGS. 1-30, the present teachings provide a power transfer system 10 to enable, power transfer from one or more power sources to one or more power recipients. By way of example and discussion, in accordance with the present teachings, the power source and/or the power recipients may comprise vehicle, robots, devices, and the like, generally indicated as vehicle 12 (including vehicles 12a, 12b, ... 12i) that are each considered a platoon member. It should be understood that one or more of vehicles 12 can source, accept, and/or relay operating power and/or communications. As will be discussed herein, this may be accomplished with electric or magnetic field elements that are integrated into the vehicle body design at the front-end 14, back-end 16, or side 18 with shared power electronics 20 for both. It is expected that the size and cost for the power electronics 20 will not be significantly different from conventional automotive wireless power systems of equivalent power rating.

The current state of practice requires connected vehicle platoons to maintain a one-second time gap between the platoon members to avoid any possible crashes due to communication delays. This time gap translates into short distance gaps between vehicles at lower speeds (e.g., during stop and go traffic) and while stopping (e.g., in parking lots and intersections), enabling rather efficient V2V wireless power transfer.

Although this one-second time gap between connected vehicles is a considerable improvement over the three-second time gap recommended for legacy vehicles, the corresponding larger distance gaps at higher speeds may prevent efficient wireless transfer of power.

To facilitate V2V PT between vehicles 12a, 12b, 12i in motion, the present disclosure, as illustrated in FIG. 1, teaches vehicle-to-vehicle power transfer system 10 using a power-tether apparatus 22 (e.g. tether or boom or other embodiments set forth herein). In some embodiments, the present teachings provide power transfer system 10 that deploys automatically, upon the push of a button for example, between a charging and receiving vehicle (e.g. 12a and 12b) traveling longitudinally. It should be noted, however, that power transfer system 10 may be deployed laterally or longitudinally (e.g. 12b and 12i in FIG. 1).

A major limitation to longitudinal deployment may be the requirement to maintain a one second gap between platooning vehicles (which is equivalent to about 25 meters at 60 mph); though we imagine that as sensor and communication technologies advance, the safety distance will shrink considerably. Note, however, that the safety gaps for lateral deployment could be less than one meter; hence it is an attractive alternative to longitudinal deployment, especially under full penetration of CAVs where vehicles may not need to pass one another.

Figure 2A:
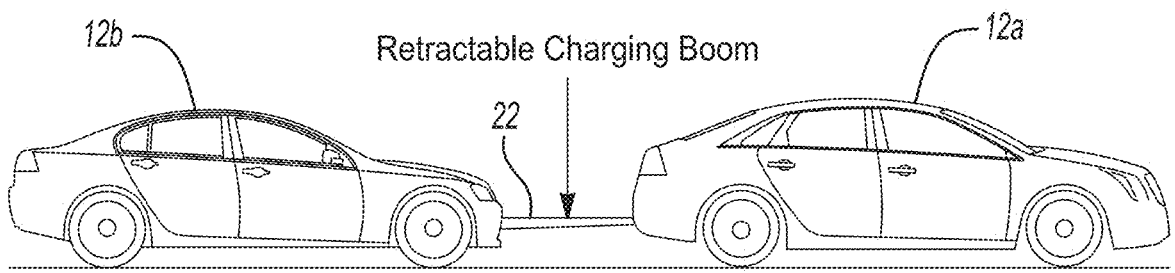
FIGS. 2A-2D illustrate a plurality of coupling embodiments according to the principles of the present teachings.
Figure 2B:
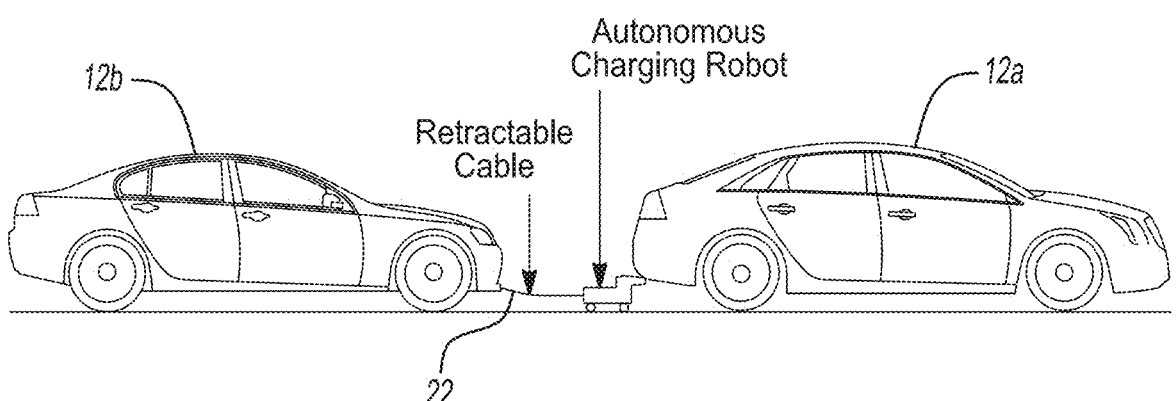
Figure 2C:
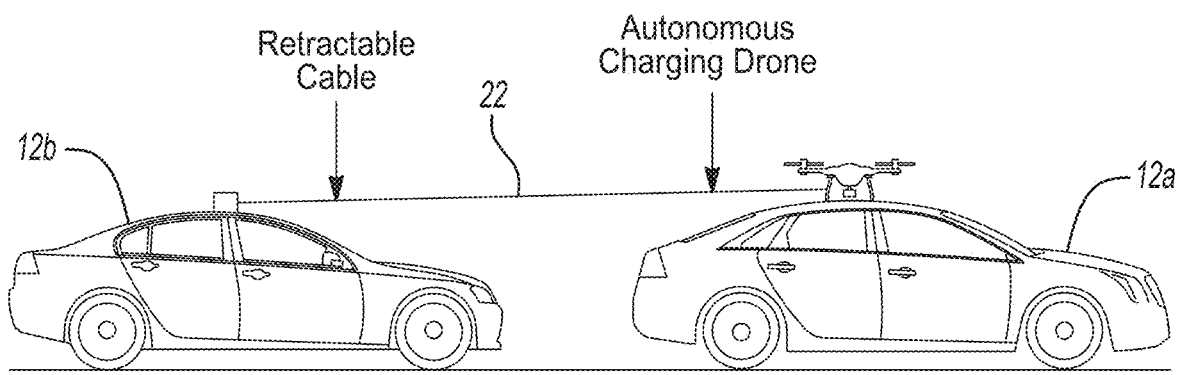
Figure 2D:
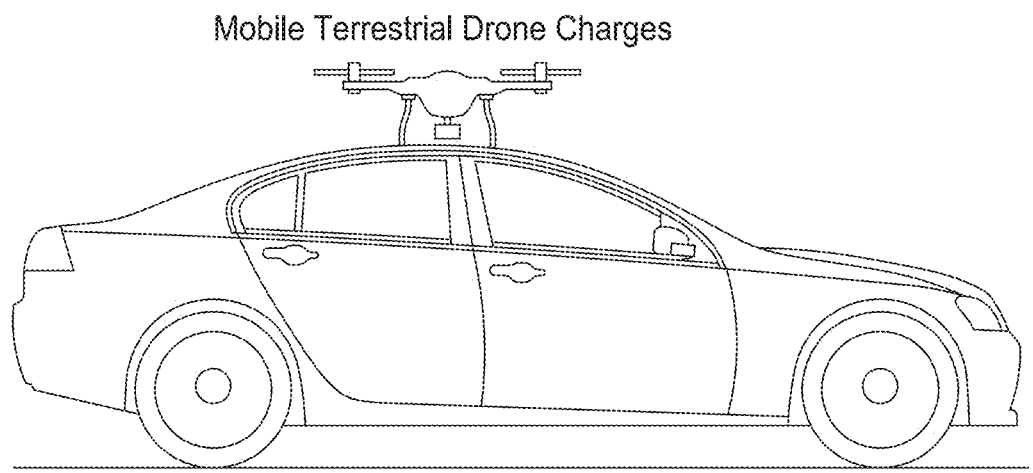

As illustrated in FIGS. 2A-2C, the power-tether apparatus 22 may be stowed in one or both of the vehicles and deployed only when needed. In some embodiments, as illustrated in FIG. 2A, the power-tether apparatus 22 comprises a retractable boom having compliant joints that allow for a suitable amount of longitudinal, vertical and lateral misalignment due to irregular road surfaces or slight speed variations. In some embodiments, as illustrated in FIG. 2B, power-tether apparatus 22 can comprise a motorized tether (charging cable) that emerges from the charging vehicle (e.g. 12b) and drives itself to the receiving vehicle (e.g 12a) to establish a secure connection for power transfer. In some embodiments, as illustrated in FIG. 2C, power-tether apparatus 22 can comprise an aerial vehicle or drone device that emerges from the charging vehicle (e.g. 12b) and flies or propels itself to the receiving vehicle (e.g 12a) to establish a secure connection for power transfer. Whichever the case, power-tether apparatus 22 can be equipped with low cost actuators and sensors for motion guidance and fine adjustments. Its motion will also be facilitated by high-level automation features, like adaptive cruise control, on the charging and receiving vehicles. Connection of power-tether apparatus 22 could be facilitated by electro-magnets and/or permanent magnets to attract the boom to the receptacle.

Non-contact power transfer can be achieved electromagnetically through a zero-gap separable-core transformer, which will be capable of fast-charging rates of 50 kW or more. By using a zero gap and a self-shielding design, high transfer efficiencies (98% or greater) are expected along with negligible stray fields. There is a high degree of safety because of galvanic isolation with no exposed conductors, minimal stray field, and a guarantee of no arcing in the event of an inadvertent disconnect.

Inverter (DC/AC power conversion) frequency is a key factor in determining the size and efficiency of power transfer system 10 with an optimum that depends on the economic and engineering objectives.

In order to maximize the functionality and usefulness of the present teachings, in some embodiments routing algorithms can place the vehicles 12 in spatiotemporal proximity of one another, or MFCs. In the context of passenger transportation, when routing vehicles, power transfer system 10 has to take into consideration multiple factors and conflicting objectives such as: (i) the detours required to join a platoon, (ii) the energy efficiency due to smaller vehicle sizes (iii) the energy efficiency resulting from having vehicles travel in platoons, (iv) the distance vehicles need to travel together for sufficient transfer of power, (v) location of charging infrastructure, (vi) the detour cost for charging, and (vii) how to assign passengers to vehicles with different levels of power. The benefits of the present teachings become even more prominent for heavy-duty trucks traveling for long distances, as factors such as detours to join a platoon become negligible in comparison to the considerable amount of energy efficiency obtained by having vehicles move in platoons for long distances without having to make charging detours.

In order to quantify the energy savings of the present teachings, an agent-based simulation model is developed that runs the routing algorithms on the back-end. This simulation model quantifies the traffic implications of lateral deployment of tethering, as well as the impact of the present teachings on reducing dependency on charging station infrastructure and on addressing the range anxiety concerns. It has been found that the present teachings would lead to energy savings, reducing infrastructure investments for charging stations, and improving the driving range of EVs.

In some embodiments, an algorithm is developed that includes an individually rational, incentive compatible, and budget balanced mechanism that optimally places vehicles in spatiotemporal proximity of one another, and determines the amount of transaction between vehicle pairs engaging in transfer of power. This mechanism is designed to ensure that individuals would benefit from participating in the system (and therefore voluntarily do so), that they cannot "game" the system by not being truthful in specifying their private information (e.g., their value of time), and that the system can be financially independent.

In some embodiments, specialized, centralized, and distributed algorithms are developed to solve large-scale routing, scheduling, and pricing optimization problems. Algorithms are developed to find user-equilibrium solutions, where agents behave selfishly to maximize their individual utilities. Algorithms are developed to find system-optimal solutions, where a system operator can dictate to EVs their routes, and/or schedules; and/or prices so as to optimize for an objective. Algorithms are developed to plan individualized itineraries (routes, schedules, prices) by soliciting private information from agents; these algorithm may or may not satisfy incentive-compatibility and/or individual-rationality conditions and may or may not be budget-balanced and/or fair. Algorithms are developed to learn, rather than solicit, private parameters of agents. Finally, an agent-based simulation model with a layer dedicated to the routing-scheduling-pricing optimization algorithm is developed to measure the energy savings, infrastructure investment reductions, and driving range improvements, and potential reduction in battery size that can result from adopting the technology under various penetration rates.

Accordingly, the present teachings provide a vehicle-to-vehicle power transfer system 10 for use between a first vehicle 12a and at least a second vehicle 12b, the system having an electric power system disposed in each of the first and second vehicles. The electric power system is configured to provide electrical drive power to a vehicle drive system for propulsion of the associated vehicle. The power transfer system is configured to transfer electric power from at least the electric power system of the first vehicle to the electric power system of the second vehicle.

Figure 29:
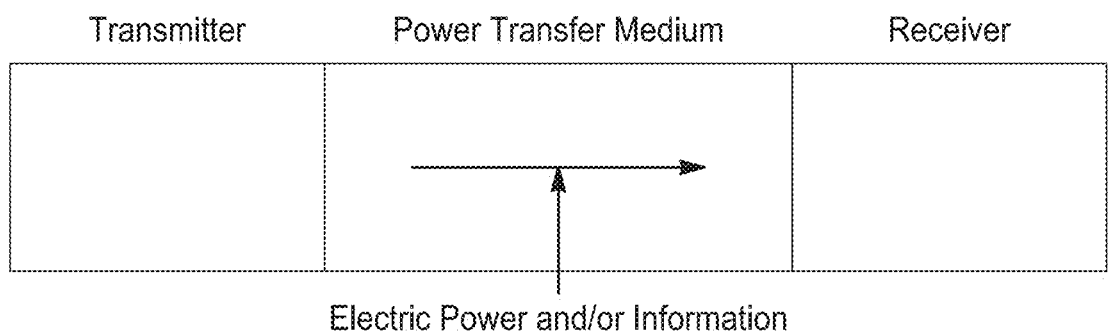
FIG. 29 illustrates a block diagram of a unidirectional power transfer system from a transmitter to a receiver according to the principles of the present teachings.
Figure 30:
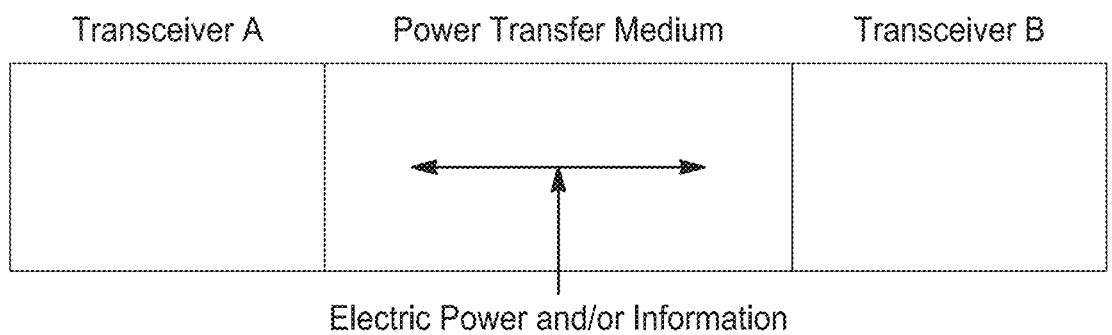
FIG. 30 illustrates a block diagram of a bi-directional power transfer system between transceivers according to the principles of the present teachings.

In some embodiments, the power transfer system 10 is a uni-directional or bi-directional power transfer system configured to transfer electric power from the electric power system of the first vehicle to the electric power system of the second vehicle and further configured to receive electric power from the electric power system of the second vehicle to the electric power system of the first vehicle. FIG. 29 illustrates a power transfer system that is uni-directional and FIG. 30 illustrates a power transfer system that is bi-directional.

In some embodiments, power transfer system 10 may transfer information in the same manner as electric power. The components used for power transfer may be used to communicate information simultaneously with the transfer of power or absent of power transfer.

In some embodiments, additional components for the purposes of communicating information may use the medium for power transfer, for example a transmission line, simultaneously with the transfer of power or absent of power transfer.

Figure 3:
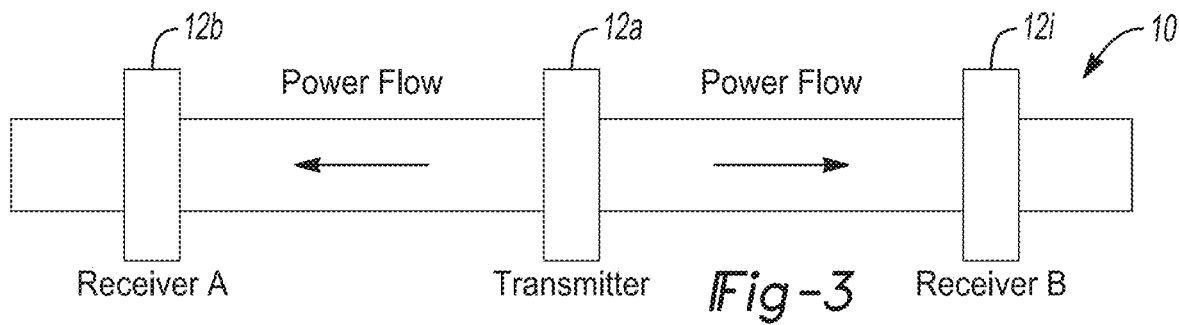
FIG. 3 illustrates a transfer of power from a transmitter to a plurality of receivers according to the principles of the present teachings.

In some embodiments, as illustrated in FIG. 3, power transfer system 10 comprises one vehicle 12a transmitting power to a plurality of vehicles 12b, 12i. For example, in a truck platoon, one truck with a fuel cell power source may transfer power to other trucks with rechargeable battery energy storage.

Figure 4:
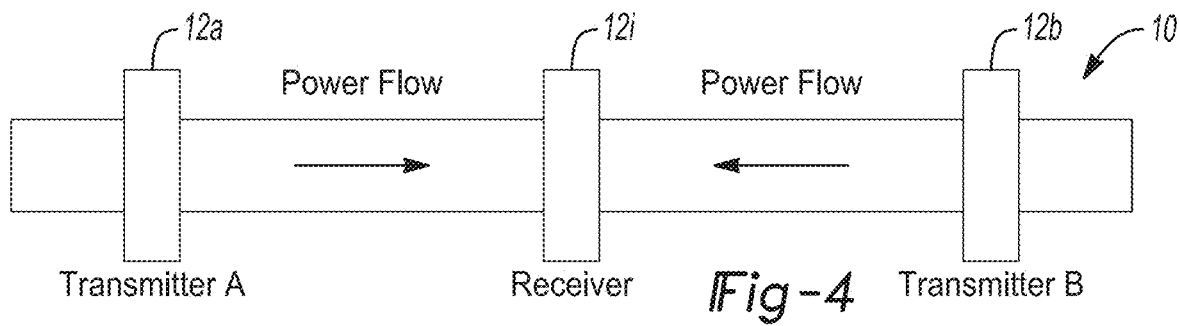
FIG. 4 illustrates a transfer of power from a plurality of transmitters to a receiver according to the principles of the present teachings.

In some embodiments, as illustrated in FIG. 4, power transfer system 10 comprises a plurality of vehicles 12a, 12b transmitting power to one vehicle 12i. For example, a plurality of small vehicles with power transfer devices with small power capability may transfer power to a large vehicle with power transfer devices with high power capability.

Figure 5:
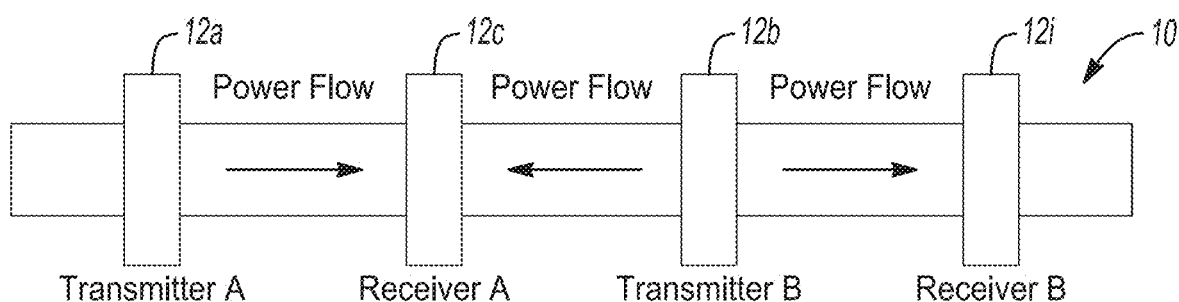
FIG. 5 illustrates a transfer of power from a plurality of transmitters to a plurality of receivers according to the principles of the present teachings.

In some embodiments, as illustrated in FIG. 5, power transfer system 10 comprises a plurality of vehicles 12a, 12b transmitting power to a plurality of vehicles 12c, 12i. For example, Transmitter B (12b) may be a high power device transferring power to both Receiver A (12c) (high power device) and Receiver B (12i) (lower power device) while Transmitter A (12a) (lower power device) transfers power to Receiver A (12c) (high power device).

Figure 6:
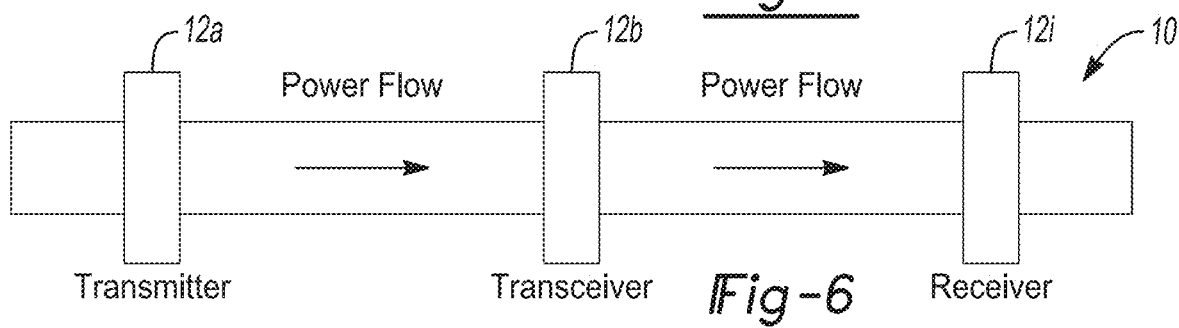
FIG. 6 illustrates a transfer of power from a transmitter through a transceiver to a receiver according to the principles of the present teachings.
Figure 7:
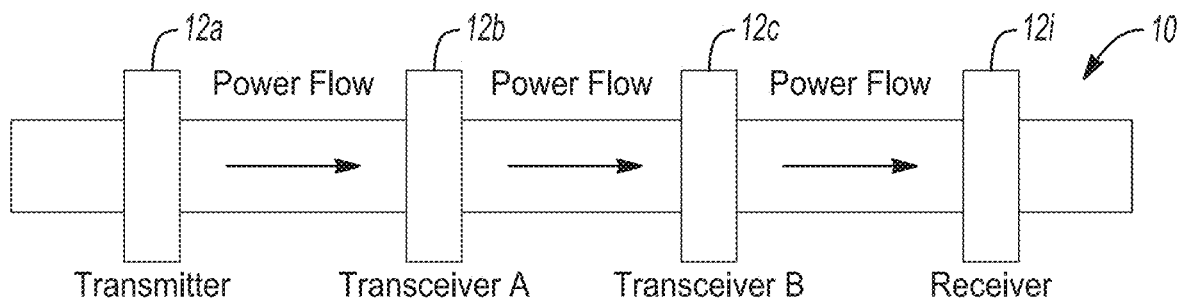
FIG. 7 illustrates a transfer of power from a transmitter through a plurality of transceivers to a receiver according to the principles of the present teachings.

In some embodiments, as illustrated in FIGS. 6 and 7, power transfer system 10 comprises one vehicle 12b relaying power from one vehicle 12a to another vehicle 12i. The power transfer system 10 may comprise of a plurality of transceivers. For example, the Transmitter (12a) is a device on a truck with a fuel cell power source and Transceiver A (12b), Transceiver B (12c), and Receiver (12i) may be devices on a truck with rechargeable battery energy storage. This may be used in electrified truck platooning.

Figure 8A:
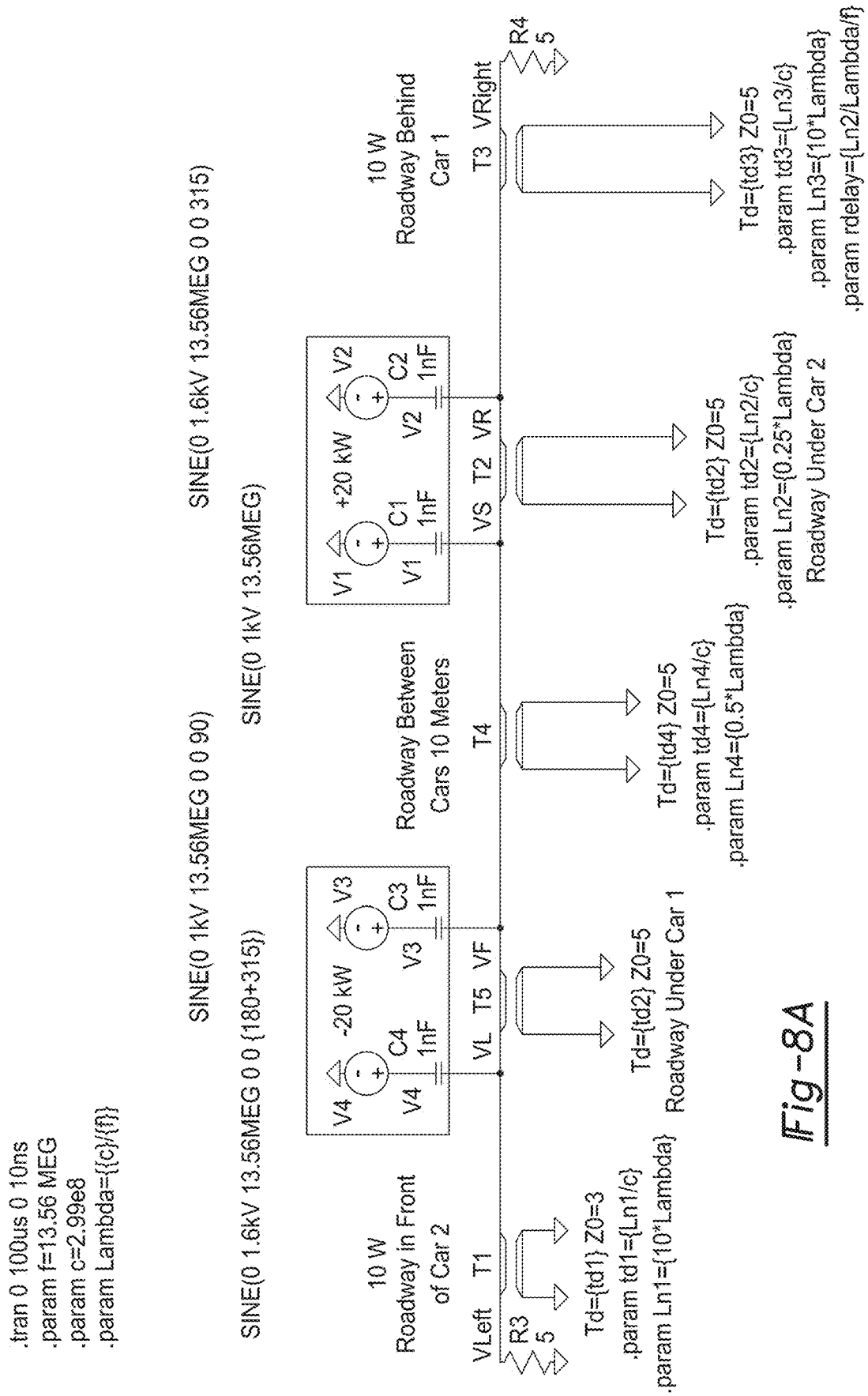
FIG. 8A is an electrical schematic of a power transfer system according to some embodiments of the present teachings.
Figure 8B:
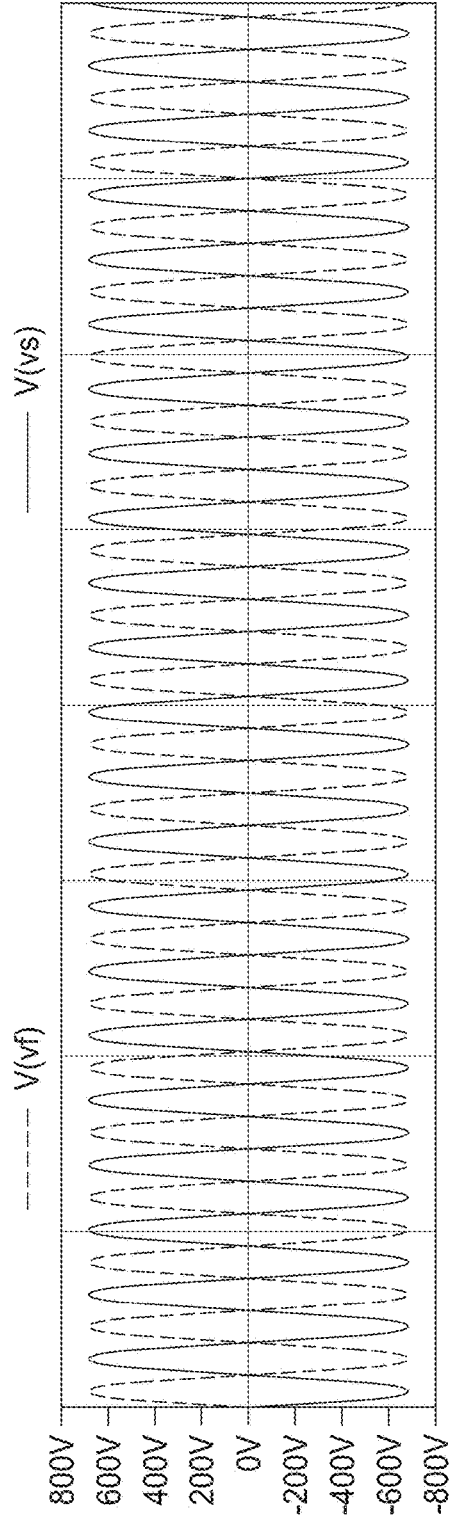
FIG. 8B is a graph illustrating the voltage at coupling point of the transmitter and the voltage at the coupling point of the receiver on the transmission line of a power transfer system according to some embodiments of the present teachings.
Figure 8C:
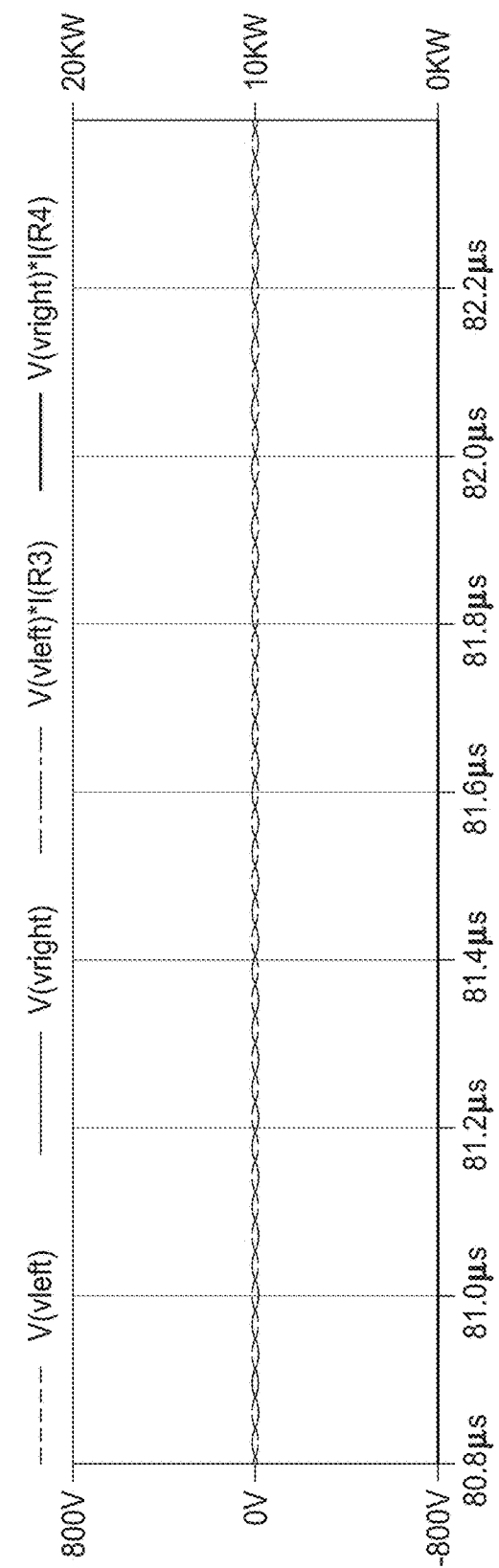
FIG. 8C is a graph illustrating the voltages and power at the termination points of the transmission lines of a power transfer system according to some embodiments of the present teachings.
Figure 14:
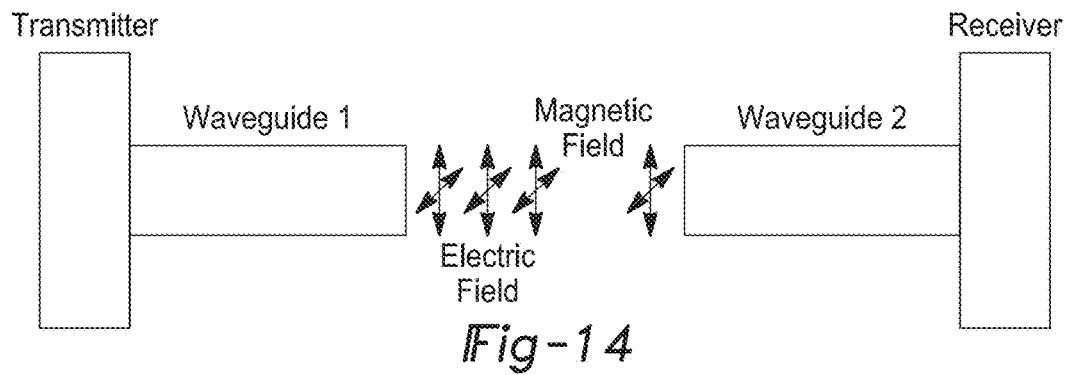
FIG. 14 illustrates an electromagnetic power transfer system according to some embodiments of the present teachings.

In some embodiments, power transfer system 10 is "spatially directed". For example, as illustrated in FIG. 8A, the transmitter and/or receiver may use additional devices to synthesize a "short" at one-quarter of a wavelength from the said transmitter or receiver when the medium for power transfer is a transmission line. This example is shown in FIG. 14 as a SPICE circuit simulation of connected transmission line sections with the intention of transferring 20 kW of power at 13.56 MHz from Car 2 to Car 1. Presumably, the vehicles are traveling on a long roadway with an embedded transmission line. A very long uniform transmission line can be well approximated by termination resistances R3 and R4. The power transfer devices in Car 1 comprises two transceivers that are represented by voltage sources V3 and V4 and are coupled capacitively represented by capacitors C3 and C4 to a section T5 of the transmission line power transfer system. The power transfer devices in Car 2 comprises two transceivers that are represented by voltage sources V1 and V2 and are coupled capacitively represented by capacitors C1 and C2 to a section T2 of the transmission line power transfer system. Transmission line sections T2 and T5 are ¼-wavelength in length. The primary purpose of V1 is to transmit power to V3. The primary purpose of V2 is to minimize the power lost to the "Roadway Behind Car 1" represented by T3 and R4. The primary purpose of V3 is to receive power from V1. The primary purpose of V4 is to minimize the power lost to the "Roadway in Front of Car 2" represented by T1 and R3. The phase angle between the sinusoidal voltage on V1 and the sinusoidal voltage on V3 may be chosen to maximize the power transfer between V1 and V3. The phase angle between the sinusoidal voltage on V2 and the sinusoidal voltage on V1 may be chosen to minimize the power lost to R4. The phase angle between the sinusoidal voltage on V3 and the sinusoidal voltage on V4 may be chosen to minimize the power lost to R3. When power is transferred from the intended transmitter to the intended receiver, while simultaneously minimizing unintended power transfer, the power transfer system is considered to be "spatially directed." Although V2 is shown to be at ¼-wavelength in distance from V1, and V4 is shown to be at ¼-wavelength in distance from V3, this ¼-wavelength distance is not necessary for the power transfer system to be "spatially directed." FIG. 8B shows the voltage V(vs) at the coupling point of the transmitter to the transmission line T4 and the voltage V(vf) at the coupling point of the receiver to the transmission line T4. FIG. 8C shows the voltage V(vleft) and the power V(vleft)*I(R3) are nearly zero at the termination point closest to Car 1 and the voltage V(vright) and the power V(vright)*I(R4) are nearly zero at the termination point closest to Car 2, which indicate that the unintended power transfer is minimized.

In some embodiments, the power transfer system 10 is a wireless power transfer system. In a wireless power transfer system 10, power is transferred through a power transfer medium in FIGS. 29 and 30 that is a galvanic isolation. Power may be transferred through the power transfer medium using electric fields, magnetic fields, electromagnetic fields and waves, vibrations, acoustic fields and waves, and/or optical fields and waves. The power transfer medium may be air, vacuum, material, and/or metamaterial. The power transfer medium may also be intermediate conductors, waveguides, magnetic materials, electret materials, electromagnetic materials, metamaterials, liquids, solids, and/or gases.

Figure 9:
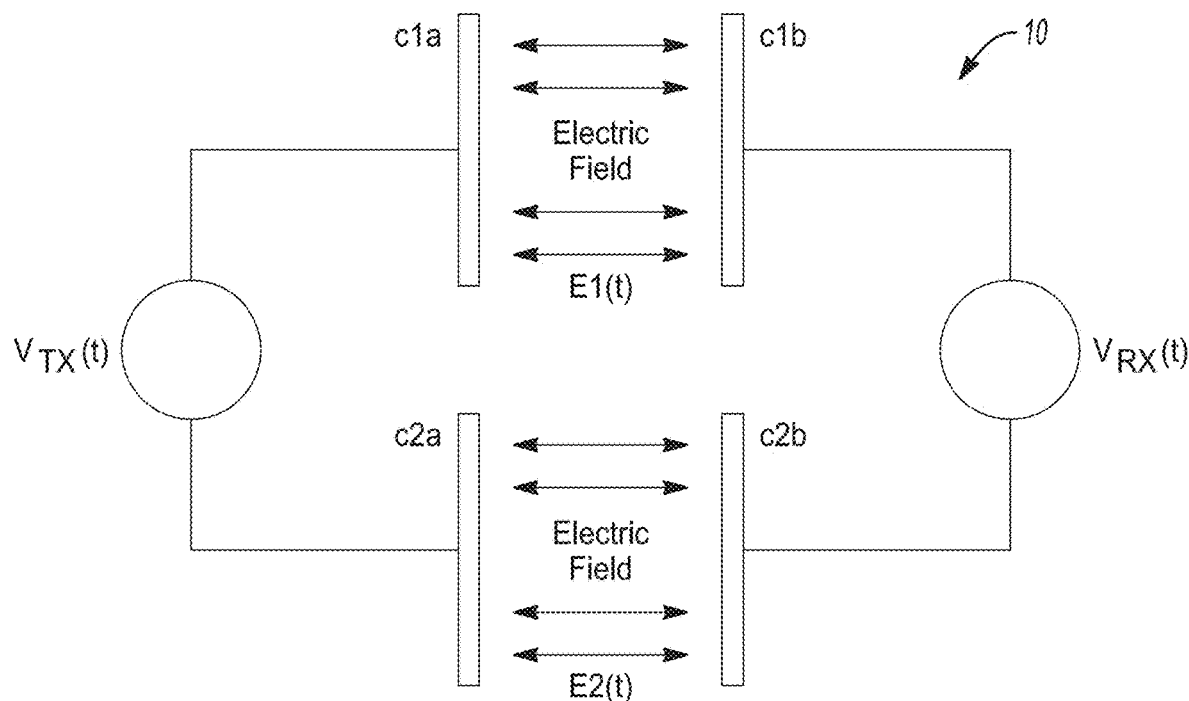
FIG. 9 illustrates a capacitive power transfer system using time-varying electric fields according to some embodiments of the present teachings.
Figure 10:
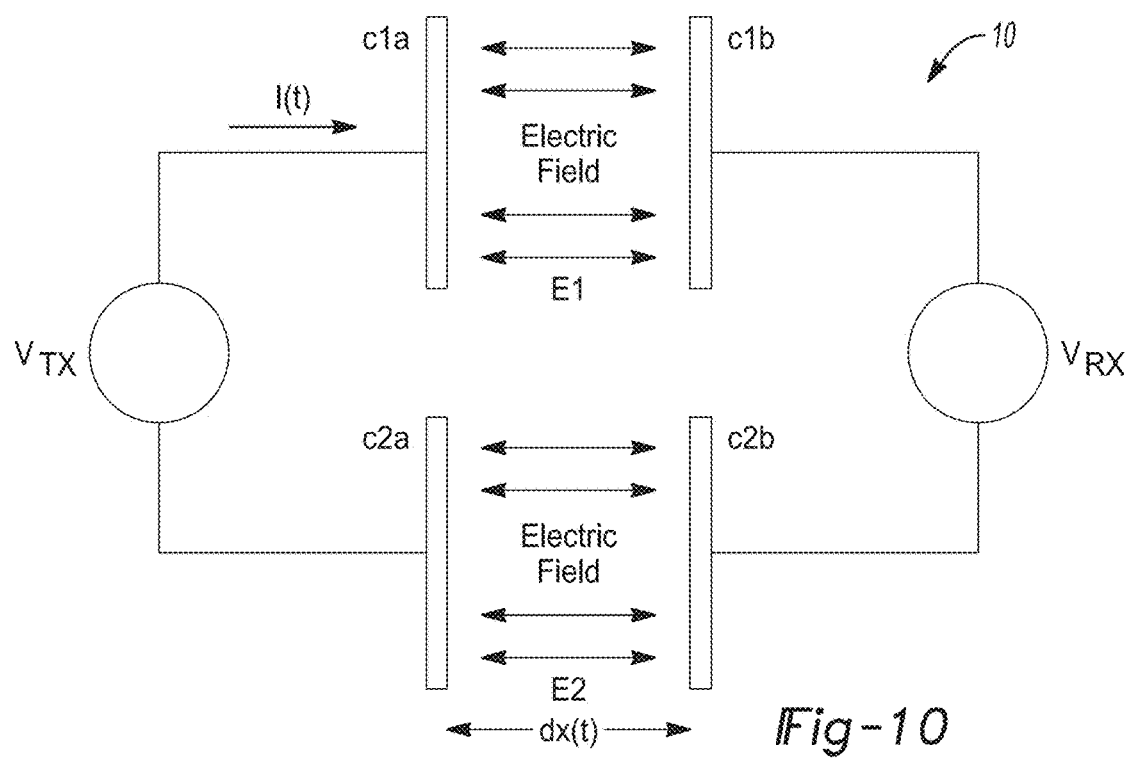
FIG. 10 illustrates a capacitive power transfer system using time-varying capacitance according to some embodiments of the present teachings.

In some embodiments, the power transfer system 10 is a capacitive power transfer system. In a capacitive power transfer system 10, as illustrated in FIG. 9, power transfer is through changing electric fields or changing capacitance. Referring to FIG. 9, $V_{TX}(t)$ corresponds to a time-varying transmitter voltage on differential capacitor plates c1a and c2a. $V_{RX}(t)$ corresponds to a time-varying receiver voltage on differential capacitor plates c1b and c2b. This results in time-varying electric field E1 (t) and time-varying electric field E2(t) through which power may be transferred. In some embodiments, as illustrated in FIG. 10, dx(t) corresponds to a time-varying spacing between capacitor plates c1a and c2b and between capacitor plates c2a and c2b. This time-varying spacing results in a time-varying capacitance between c1a and c1b and a time-varying capacitance between c2a and c2b. This results in a time-varying current I(t) through which power may be transferred.

Figure 11:
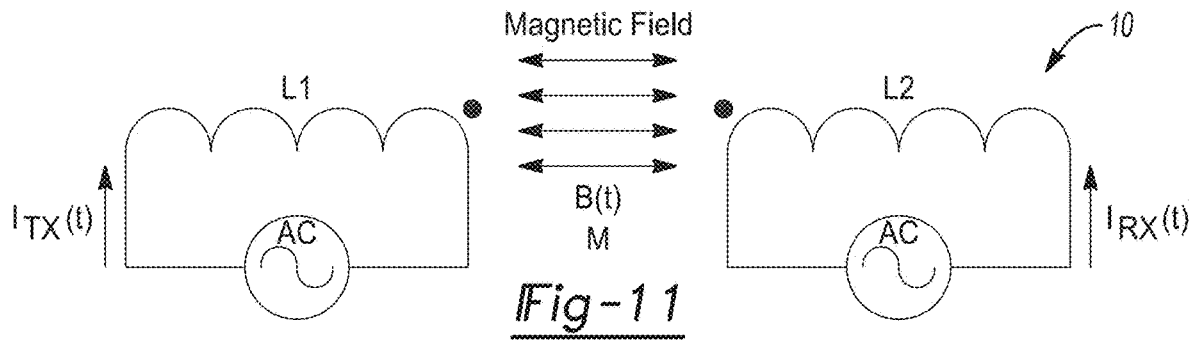
FIG. 11 illustrates an inductive power transfer system using time-varying magnetic fields according to some embodiments of the present teachings.
Figure 12:
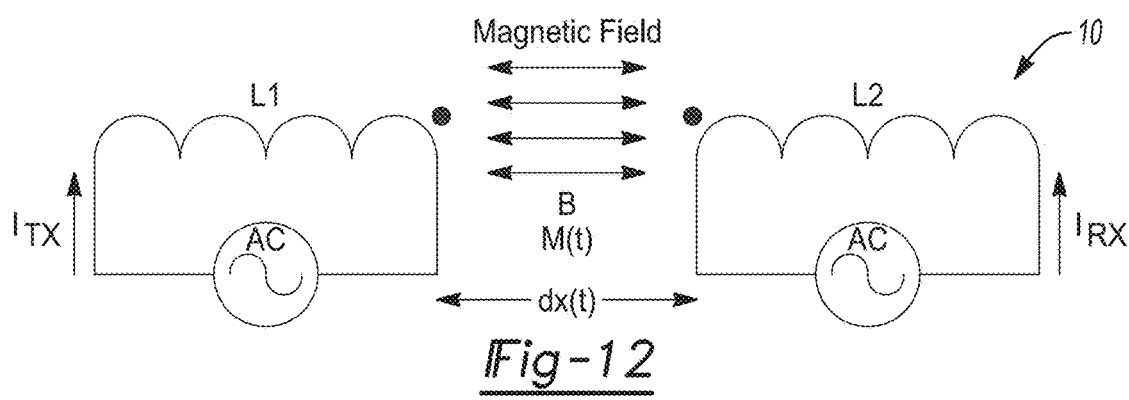
FIG. 12 illustrates an inductive power transfer system using time-varying mutual inductance according to some embodiments of the present teachings.
Figure 13:
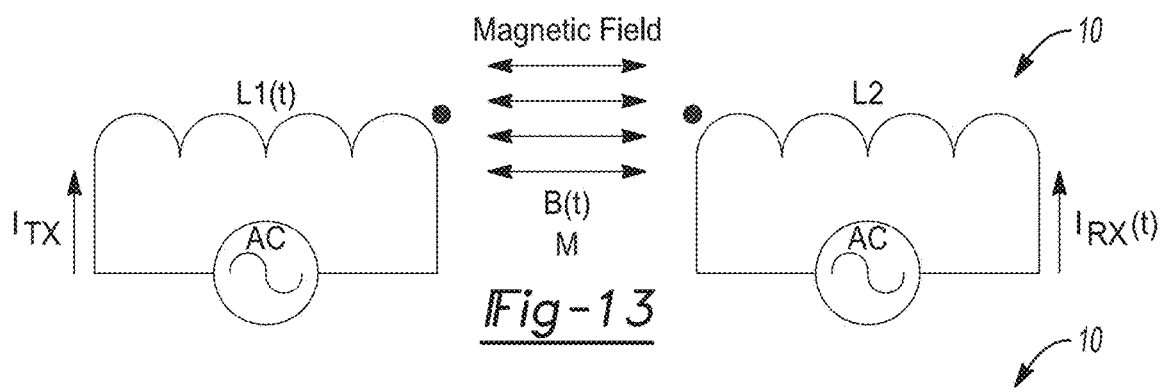
FIG. 13 illustrates an inductive power transfer system using time-varying mutual self-inductance according to some embodiments of the present teachings.

In some embodiments, the power transfer system 10 is an inductive power transfer system. In an inductive power transfer system, power transfer is through changing magnetic fields or changing inductance. There may be material in the intervening space, for example, a magnetic material, such as ferrite or a non-magnetic material, such as air. In an example of an inductive power transfer system, as illustrated in FIG. 11, $I_{TX}(t)$ corresponds to a time-varying transmitter current on inductor L1. $I_{RX}(t)$ corresponds to a time-varying receiver current on inductor L2. This results in a time-varying magnetic field B(t) through which power may be transferred. In some embodiments, as illustrated in FIG. 12, dx(t) corresponds to a time-varying distance between inductors L1 and L2. This results in a time-varying mutual inductance M(t) through which power may be transferred. In some embodiments, as illustrated in FIG. 13, L1(t) corresponds to the changing self-inductance of inductor L1, which may result in a changing magnetic field B(t) through which power may transferred.

In some embodiments, the power transfer system is an electromagnetic power transfer system. In an electromagnetic power transfer system, power transfer is through both electric and magnetic fields and may be quasistatic and/or electromagnetic waves. For example, as illustrated in FIG. 14, the Transmitter creates electric and magnetic fields that travel through Waveguide 1. The electric fields and magnetic fields are perpendicular to each other. The electric and magnetic fields leave Waveguide 1 and couple to Waveguide 2 through the air. The electric and magnetic fields travel through Waveguide 2 to the Receiver. In this manner, power may be transferred.

In some embodiments, the power transfer system comprises a zero-gap separable-core transformer. For example, as illustrated in FIG. 15, two U-cores are used for the magnetic material to transfer power from Winding 1 and Winding 2. Winding 1 is wound around Magnetic Core 1 and Winding 2 is wound around Magnetic Core 2. Magnetic Core 1 and Magnetic Core 2 are distinctly separate cores but with pole faces touching with zero or nearly zero gap. Magnetic fields created from Winding 1 are coupled to Winding 2. Other magnetic core configurations are possible including E-cores, Pot Cores and other variants. This type of separable core has high coupling between Winding 1 and Winding 2 and has the potential to transfer power at high efficiency and with low magnetic field leakage.

In some embodiments, the power transfer system comprises a retractable apparatus configured to transfer the electric power from at least the electric power system of the first vehicle to the electric power system of the second vehicle. For example, this may be implemented as in FIG. 2A as a retractable charging boom, in FIG. 6B as a retractable cable, and/or in FIG. 2C as a retractable cable with associated drone device.

In some embodiments, the power transfer system 10 comprises an electromechanical system that can retract and/or adjust the physical distance or angle between the power transfer device and a power transfer medium, such as a roadway based solution. For example, as illustrated in FIG. 16A, the electromechanical system 30 can adjust the physical distance between an electromagnetic coupler 32 to a stripline transmission line 34 on the surface of a road 36. In some embodiments, as illustrated in FIG. 16B, an electromechanical system 32 adjusts the physical distance between a capacitive coupler 38 and an edge-coupled microstrip 40 embedded in the road 36.

In some embodiments, the power transfer system 10 comprises a mechanical, electromechanical, and/or hydraulic system that can retract and/or adjust the physical distance or angle between the power transfer device and a power transfer medium.

In some embodiments, the power transfer system 10 comprises sections of shorter length power transfer systems. These power transmission sections may be identical and connected together with transitions that may be identical or different. These power transitions may be different and connected together with transitions that are identical or different. In some embodiments, the power transfer system 10 comprises sections of different physical size (for example narrower transmission lines), physical characteristics, and/or electromagnetic characteristics.

Figure 17:
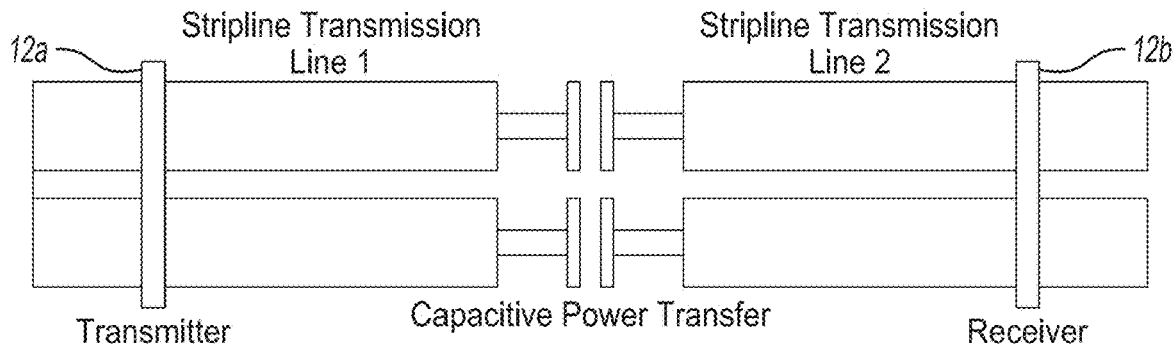
FIG. 17 illustrates a power transfer system having connected and different power transfer systems according to some embodiments of the present teachings.
Figure 18A:
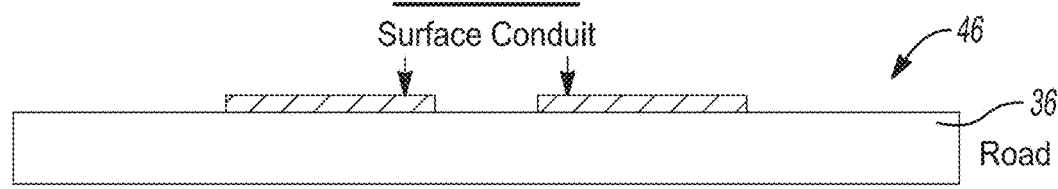
FIGS. 18A-18E illustrate a power transfer system having roadway conduits disposed on or in a roadway surface according to some embodiments of the present teachings.
Figure 18B:
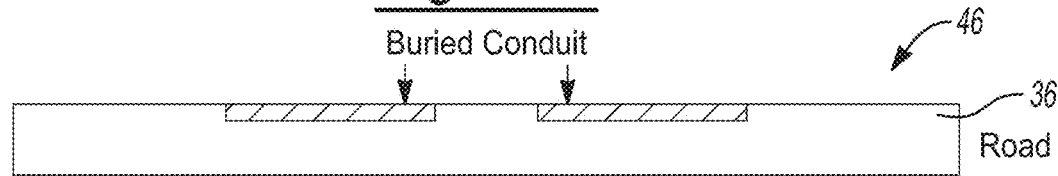
Figure 18C:
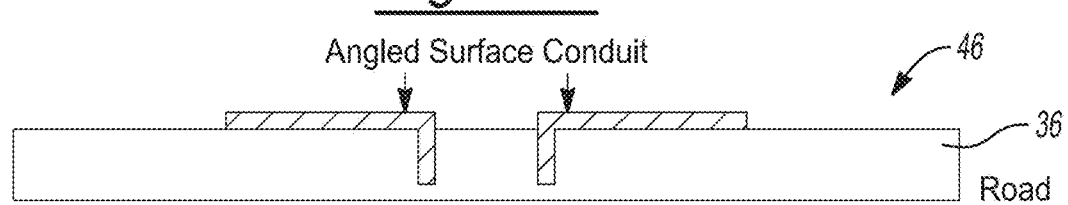
Figure 18D:
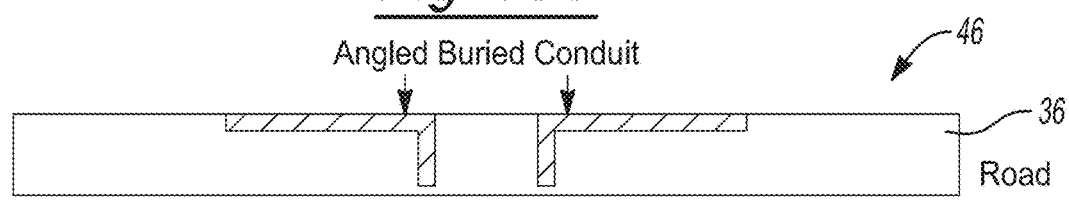
Figure 18E:
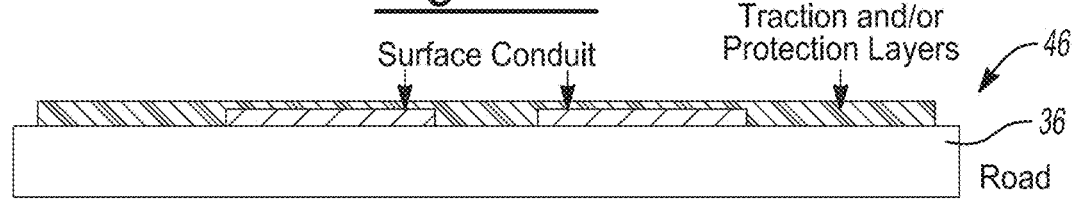

In some embodiments, the power transfer system 10 comprises sections of different type—for example, a transmission line section connected to a capacitive power transmission section. For example, in some embodiments as illustrated in FIG. 17, the Transmitter is coupled to a Stripline Transmission Line 1 and the Receiver is coupled to Stripline Transmission Line 2. The goal is to transfer power from the Transmitter to the Receiver. Stripline Transmission 1 is connected to Stripline Transmission 2 through a Capacitive Power Transfer System.

Figure 27:
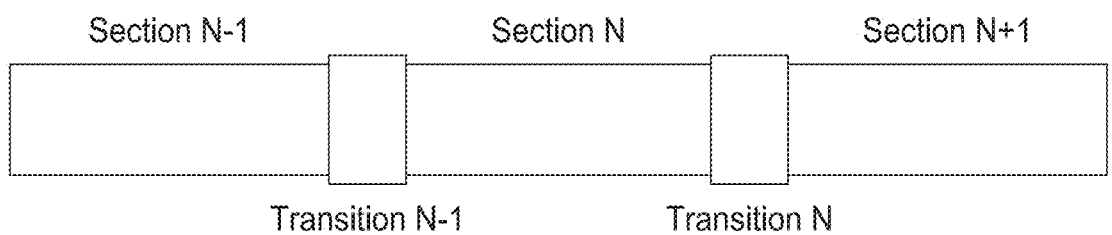
FIG. 27 illustrates a block diagram of a power transfer system that is partitioned into a plurality of sections with the sections connected by transitions according to some embodiments of the present teachings.
Figure 28:
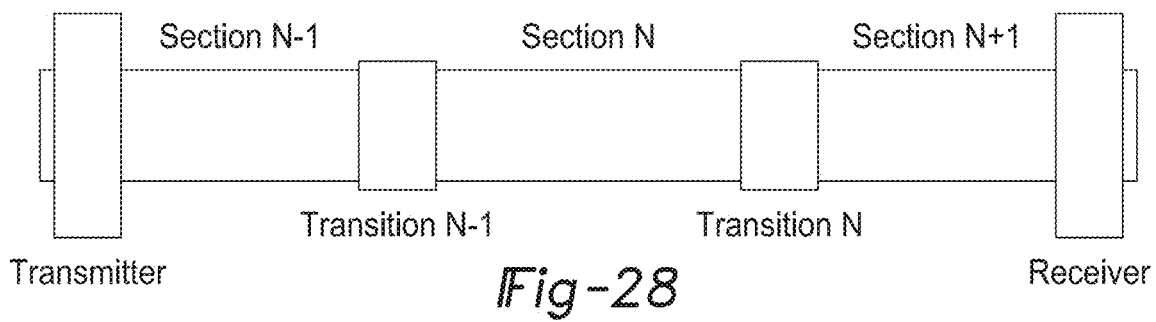
FIG. 28 illustrates a block diagram of a power transfer system that is partitioned into a plurality of sections with the sections connected by transitions and a transmitter that is coupled to one of the sections transferring power and/or information to a receiver that is connected to one of the sections according to some embodiments of the present teachings.

In some embodiments, the power transfer system 10 comprises sections that are connected by transitions that may couple each section electrically, inductively, capacitively, electromagnetically, galvanically, and/or by other means that transfer electric power, which is illustrated in the block diagram in FIG. 27. An example in FIG. 28 illustrates how a transmitter can couple to one section of the power transfer system and a receiver can couple to another section of the power transfer system to transfer electric power and/or information.

In some embodiments, the power transfer system comprise a transmission line system 46. FIGS. 18A, 18B, 18C, 18D, and 18E are examples of conduits for power transfer. If the length of these conduits are a significant fraction of a wavelength of the electromagnetic field between these conduits, for example greater than ⅛-wavelength, then the conduits behave as a transmission line.

Figure 19:
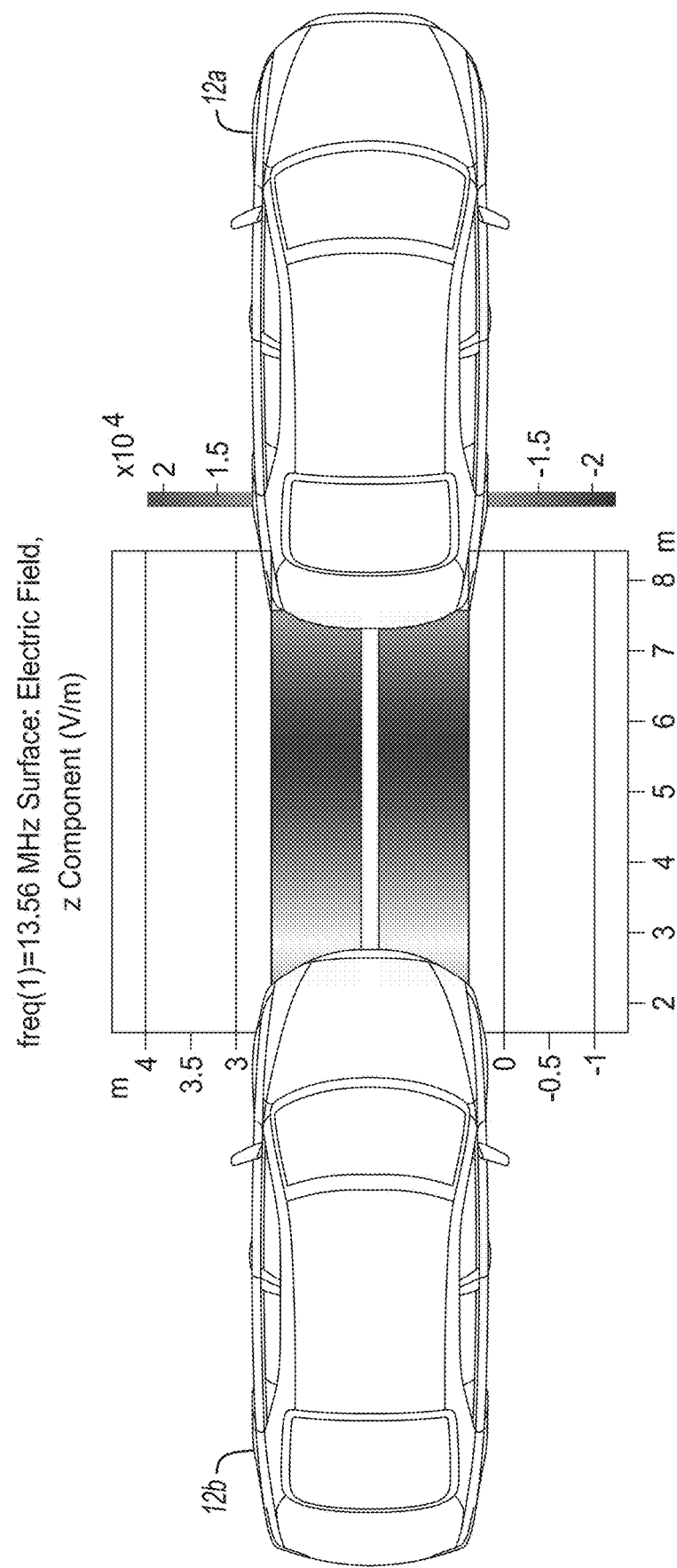
FIG. 19 illustrates a z-component of the electric field within an edge-coupled microstrip according to some embodiments of the present teachings.
Figure 20:
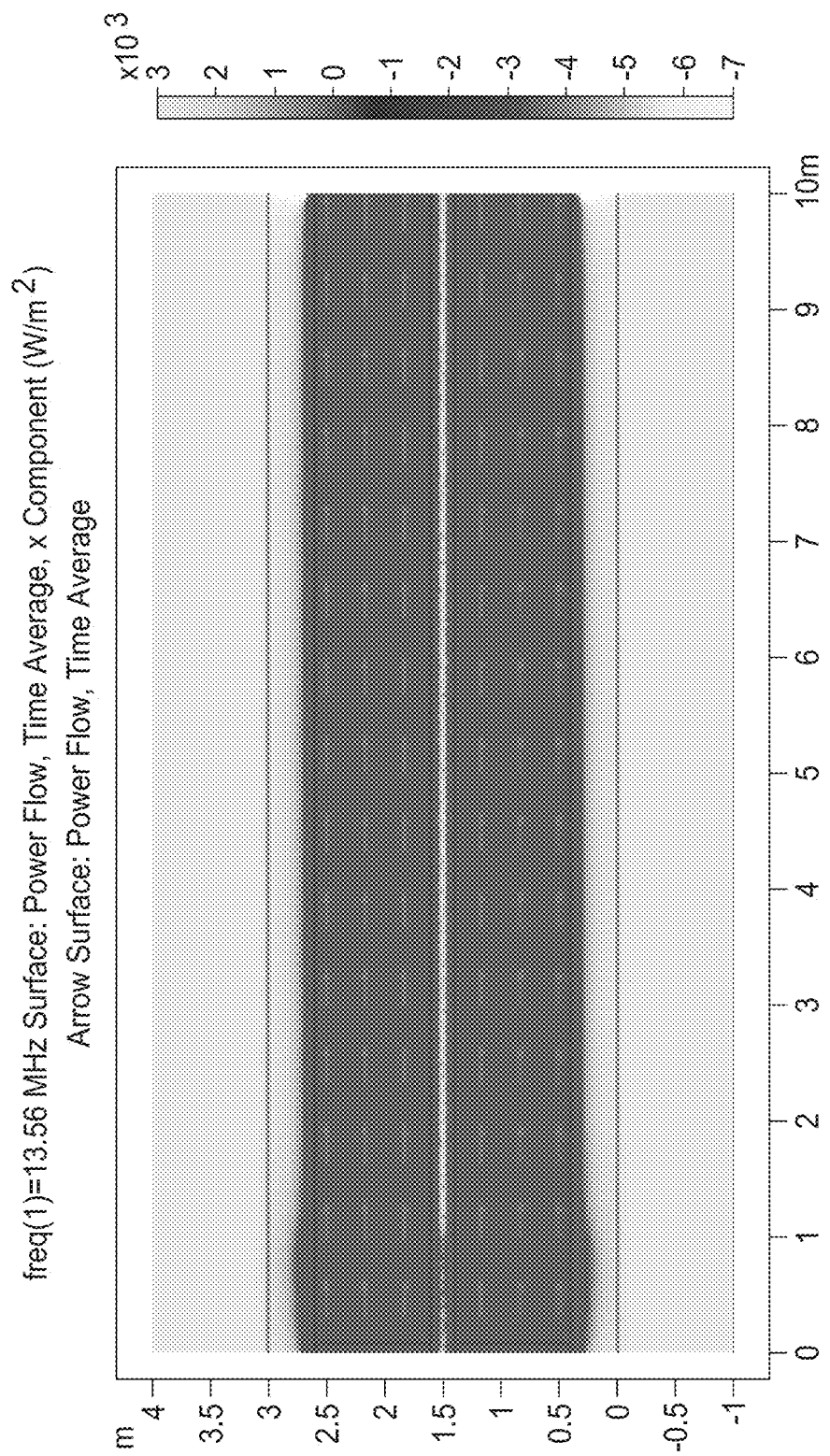
FIG. 20 is a Poynting vector diagram illustrating power flow in the transmission line from one vehicle to another vehicle according to some embodiments of the present teachings.
Figure 21A:
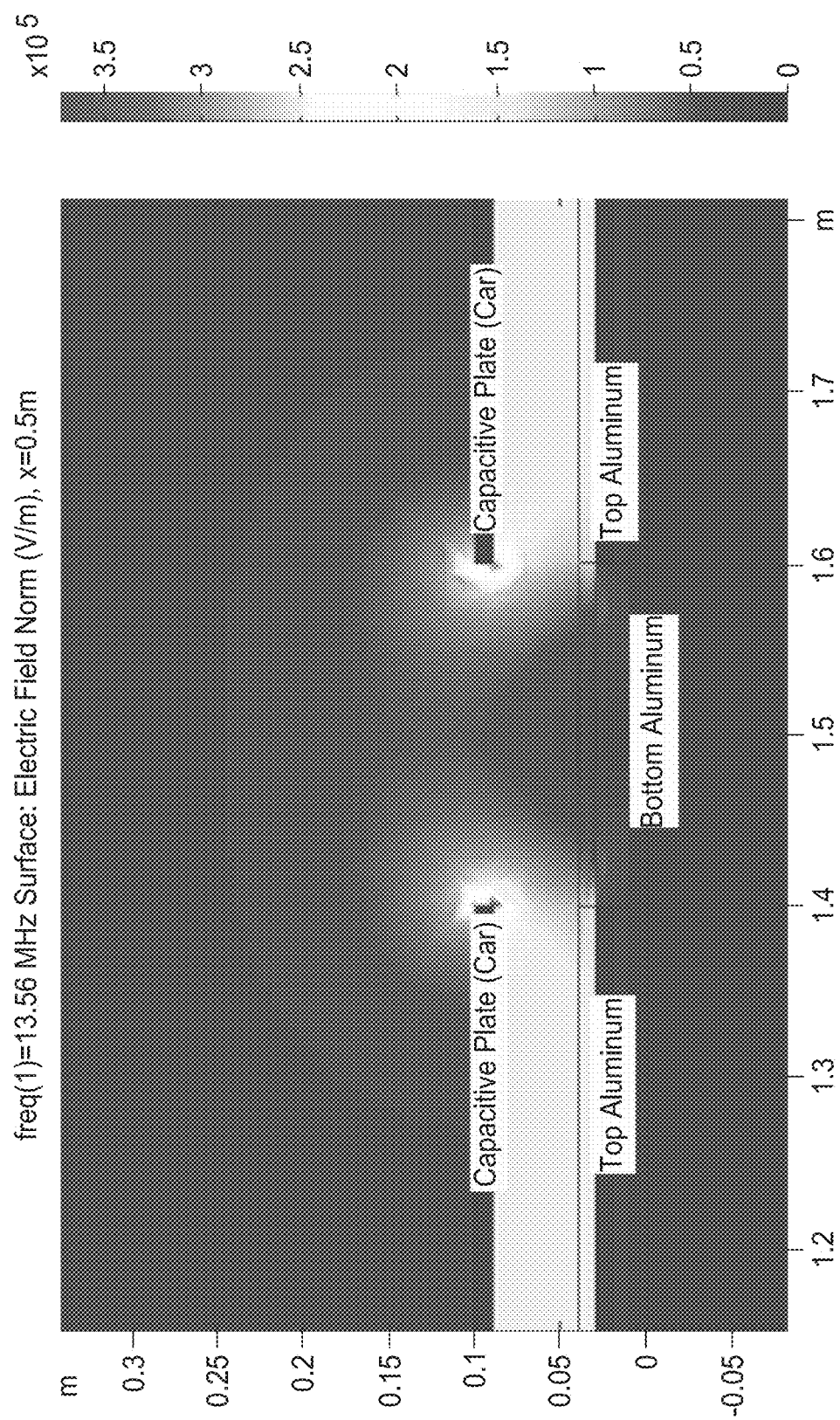
FIG. 21A illustrates an electric field distribution of the capacitive power transfer from the vehicle to the edge-coupled microstrip according to some embodiments of the present teachings.
Figure 21B:
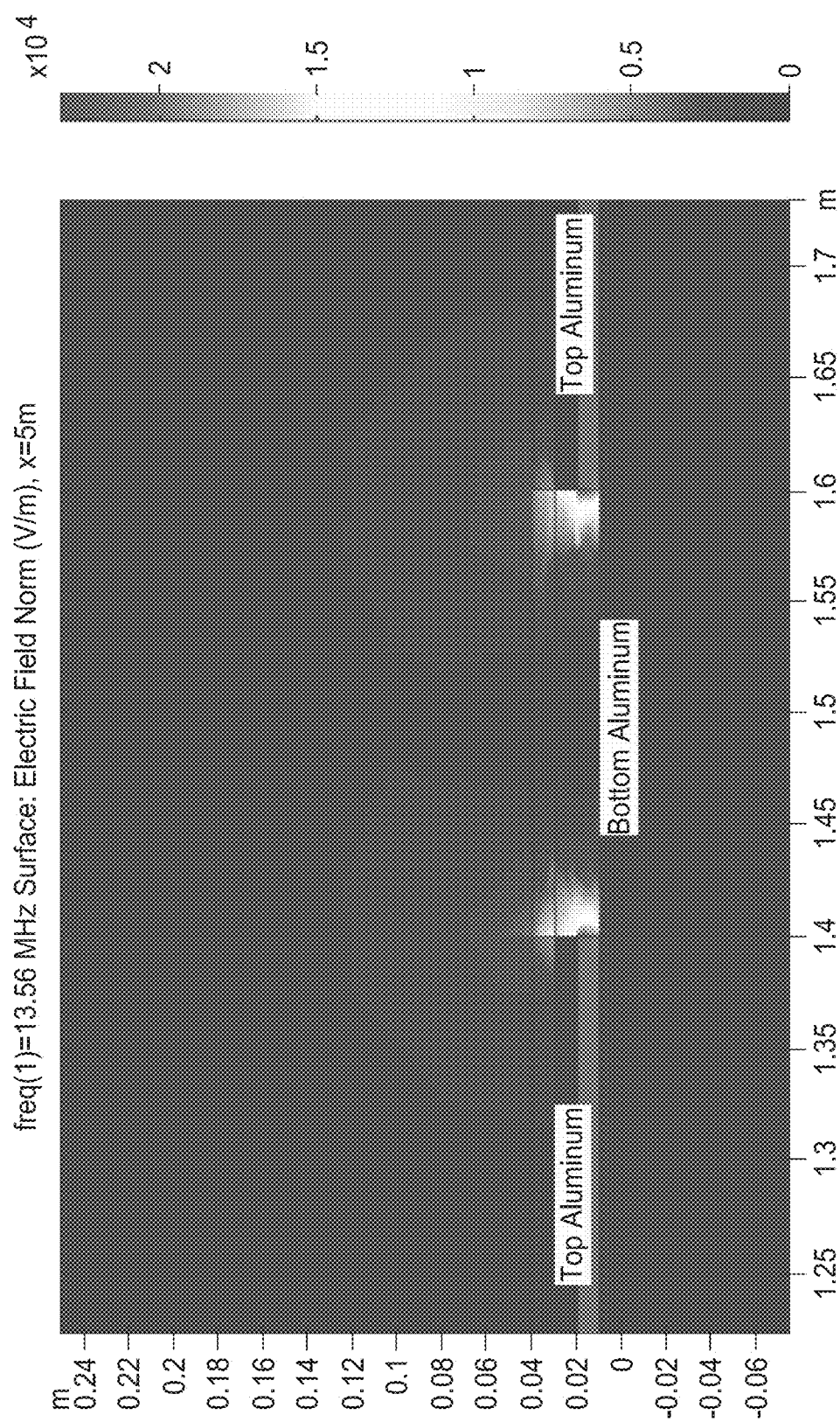
FIG. 21B illustrates an electric field distribution of the edge-coupled microstrip away from the vehicles according to some embodiments of the present teachings.

In some embodiments, the power transfer system is a planar transmission line, for example an edge-coupled microstrip configuration. Other examples include stripline, suspended stripline, microstrip, coplanar waveguide, slotline, finline, imageline. For example, in FIG. 16B, the power transfer system comprises an edge-coupled microstrip transmission line with a capacitive coupler driven at 13.56 MHz. FIG. 19 illustrates the z-component of the electric field within the edge-coupled microstrip when used to transfer power from one vehicle 12b to another vehicle 12a. FIG. 20 illustrates the real component of the Poynting vector for this example. The Poynting vector shows the power flow in the transmission line from one vehicle to another. This demonstrates that capacitive coupling to the top of an edge-coupled microstrip can drive power through the transmission line. FIG. 21A shows the electric field distribution of the capacitive power transfer from the vehicle to the edge-coupled microstrip. Most of the electric field is contained in the region between the capacitive power transfer plate and the top conductors of the edge-coupled microstrip. FIG. 21B shows the electric field distribution of the edge-coupled microstrip away from the vehicles. This figure shows that most of the electric field is contained within the edge-coupled microstrip with only a small fraction of stray electric field.

Figure 23:
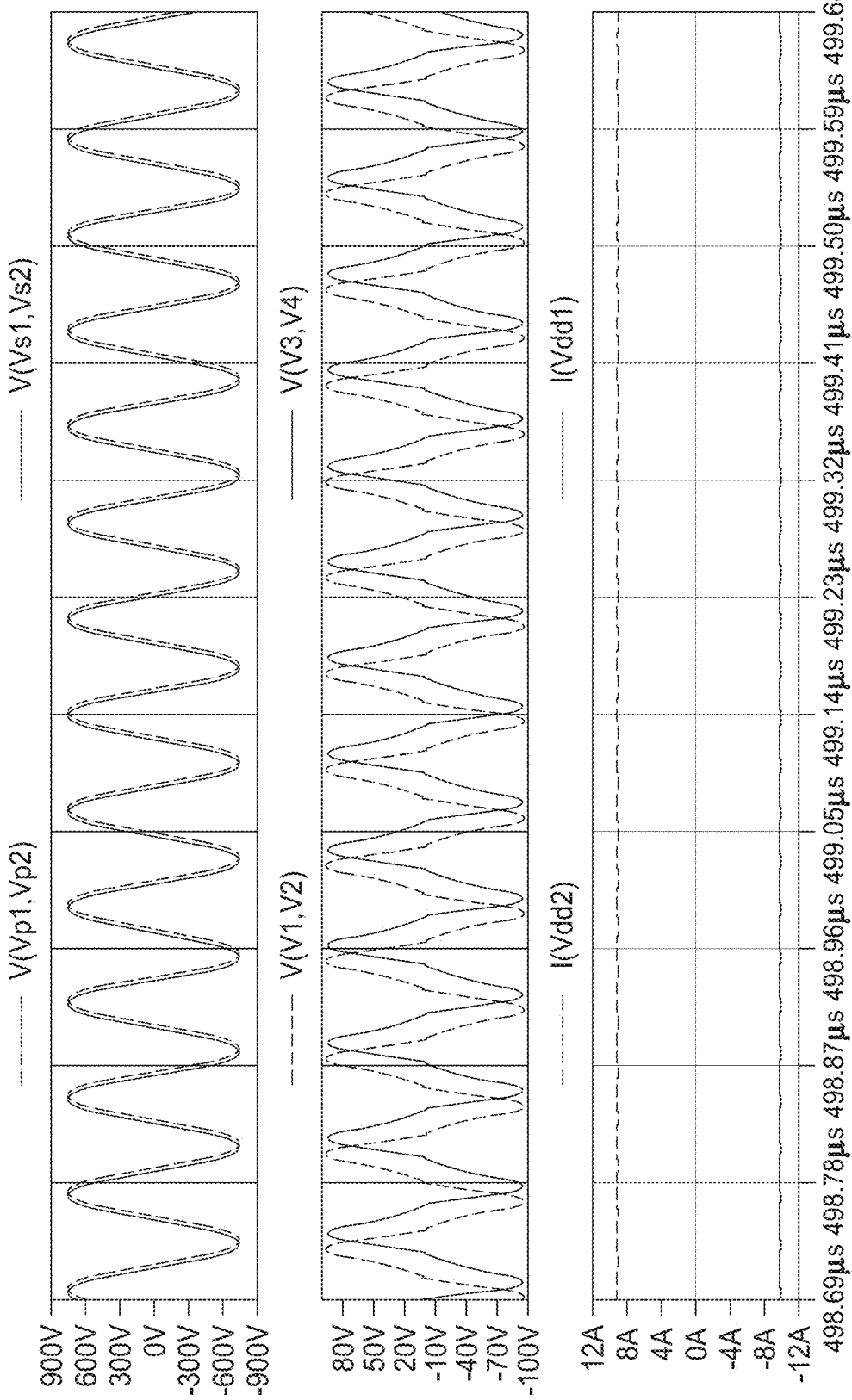
FIG. 23 are graphs illustrating the associated waveforms from the simulation of FIG. 22.

In some embodiments, the power transfer system 10 comprises a radio frequency amplifier to drive a capacitive coupler to a transmission line. An example, as illustrated in FIG. 22, is the circuit diagram for a SPICE simulation for a push-pull class E amplifier used to drive a differential capacitive coupler to a transmission line. FIG. 23 shows the associated waveforms from the simulation.

In some embodiments, the power transfer system includes structures for shielding, shunting, and/or absorbing electric fields, magnetic fields, and/or electromagnetic fields. These structures may be used for reducing electromagnetic interference, electromagnetic radiation, stray electromagnetic fields, stray magnetic fields, and/or stray electric fields. For example, as illustrated in FIG. 24, a cross-sectional diagram that shows additional conductor material to shunt stray electric fields in an edge-coupled transmission line as a power transfer system is provided.

In some embodiments, the retractable apparatus is positioned along a longitudinal direction of the associated vehicle. In some embodiments, the retractable apparatus is fixedly connectable between the first vehicle and the second vehicle.

In some embodiments, the vehicle-to-vehicle power transfer system further comprises an electric power system disposed in a third vehicle configured to provide electrical drive power to the third vehicle drive system for propulsion of the third vehicle and a power transfer system configured to transfer electric power between the third vehicle and at least one of the electric power systems of the first and second vehicles.

In some embodiments, the present teachings can comprise vehicle-to-vehicle power transfer through conduits on or in the road surface or related infrastructure. More particularly, in some embodiments as illustrated in FIGS. 2A-2D, the coupling scenarios can comprise vehicle-to-vehicle (actor-to-actor), stationary to vehicle (including, but not limited to, cars, trucks, drones, planes, flying taxis, flying cars), single vehicle-to-multiple vehicles, multiple vehicles to multiple vehicles, multiple stationary actors to moving actors (including, but not limited to, vehicles, people, animals). Autonomous charging drones (see FIG. 2D) can create a higher level of flexibility compared to their robot counterparts, since they can fly at higher elevations. This would enable charging drones to not be restricted to lane markings and to retract more easily in emergency conditions.

Mobile Terrestrial Drone Chargers may be useful in congested traffic conditions, where conventional MFCs would be harder to coordinate due to higher stochasticity of travel times, and would create additional congestion. Dual-use charging with added support for aerial drones can be accomplished on DUVs and $P^3T$. With the imminent profusion of drones, which include drone delivery systems, mobile drone chargers have the potential to augment or even replace infrastructure chargers, especially in cities with sprawling suburbs that include New York, San Francisco, Los Angeles, Chicago, Washington D.C., and Boston, among many others, where coverage and range can be costly. Many drones already have the capability to precision land on moving vehicles; embedded power transfer capability on the rooftop represents a significant capability and economic opportunity.

To this end, in some embodiments, two or more strips of material or conduits can be disposed in or on a roadway surface via, but not limited to, spraying, coating, or otherwise applying to the roadway surface, to transport information and/or energy/power from a central location to the vehicle or from vehicle-to-vehicle. As illustrated in FIGS. 18A-18E, the conducts can include electric, magnetic, electromagnetic, and/or optical phases of transfer. In the electric mode, the electricity can include AC (low or high frequency (RF)) or DC. As illustrated in FIG. 25A, opposing currents on opposing conduits can be used. In these embodiments, the currents may be alternating current or radio frequency. As illustrated in FIG. 25B, opposing currents can result in unidirectional power transfer.

In some embodiments, the vehicle can couple to the conductors galvanically, capacitively (through electric fields; see FIGS. 16A-16B), magnetically (through magnetic fields), electromagnetically (through both electric and magnetic fields), or optically (through light). It should be understood that in capacitive coupling, as illustrated in FIGS. 16A-16B, an electromechanical system can be used to maintain the spacing between the vehicle and the road conduit. In some embodiments, mechanical, electromechanical, and/or hydraulic systems may be used to maintain spacing or contact with the road and/or with the conduits. Such system may respond to road or terrain undulations or unevenness, operate in the closed-loop with information from sensors, operate in the open-loop with hard stops or mechanical interfaces or rolling interfaces, and/or combinations thereof.

Figure 26:
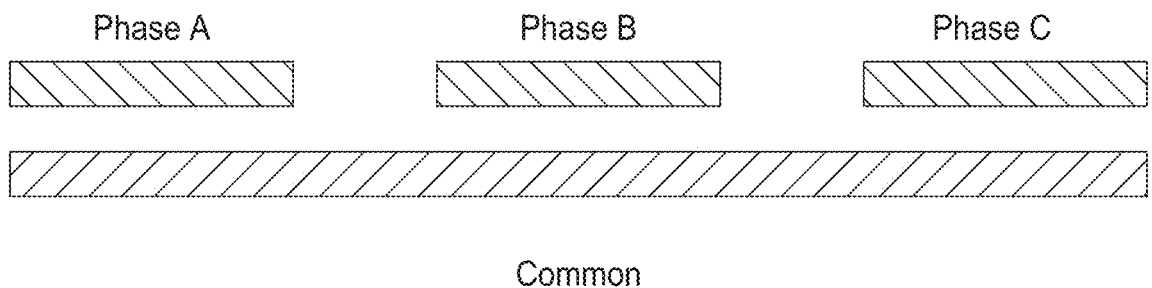
FIG. 26 illustrates an example of a multiphase transmission line that is specifically a three-phase transmission line with a common plane according to some embodiments of the present teachings.

In some embodiments, the electric, magnetic, and electromagnetic behavior of the system can be solid or hollow, waveguide, conductor, characterized by but not limited to current, voltage, electric field, magnetic field, photons, and waves. Electromagnetic transfer between vehicles can be characterized as a traveling wave or a standing wave. Transfer can be in two, three, or more (polyphase) electrical phases and traveling waves or standing waves on conduits that support these phases. An example of a multi or polyphase transmission line is illustrated in FIG. 26. This transmission line has three phases—Phase A, Phase B, and Phase C, with a floating common plane. It may be considered a three-phase edge-coupled microstrip transmission line. Each phase may be driven by a voltage and/or a current that is mutually separated by 120 degrees of electrical phase. The physical width of each phase of the transmission may or may not be identical.

In some embodiments, the conduits can include any geometry, such as but not limited to flat, vertical, at an angle, two-dimensional, three-dimensional, and can include any cross-sectional shape, such as but not limited to round, ellipsoidal, square, rectangular, or hexagonal. The conduits may be disposed on the surface, buried, or embedded in or near the road surface.

In some embodiments, the conduits can be made according to any one or more methods of construction, including, but not limited to, material sprayed on the road surface and/or pre-fabricated in part or in whole and laid down on the road surface. In spray-on applications, the material can include, for example, aluminum, alloys, composites, insulators, and metamaterials, and can be deposited via droplet spray, plasma spray, thermal spray, arc spray, and the like and may include post reaction processing. The conduits may include protection layers and/or traction layers to facilitate longevity and performance. It should be understood that the aforementioned composites may include combination and/or horizontal and/or vertical layers, woven structures, and metamaterial structures.

Sharing economy applied to the V2V PT creates a new form of economic market, to which we refer as "joint two-sided markets". In traditional two-sided markets, the buyers and the sellers form two mutually exclusive sets. In a joint two-sided market, each agent can take the role of either the seller or the buyer at each point in time. Furthermore, an agent's role in a joint two-sided market can change dynamically; that is, a vehicle can be the recipient of power in a given leg of its trip, and the supplier of power on another leg.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of sharing power between electrical vehicles comprising:
    providing a transmission line extending between a first vehicle and a second vehicle along a first section and further extending beyond the first vehicle along a second section and beyond the second vehicle along a third section; and
    transferring power from the first vehicle to the second vehicle along the transmission line such that the first vehicle comprises a first voltage source and a second voltage source and the second vehicle comprises a third voltage source and a fourth voltage source, the first, second, third, and fourth voltage sources being operably coupled to the transmission line, the step of transferring power is spatially directed from the first vehicle to the second vehicle by choosing a phase angle between the second voltage source of the first vehicle and the third voltage source of the second vehicle to facilitate transfer of the electric power along the first section and by choosing a phase angle between the first voltage source and the second voltage source to minimize transfer of the electric power along the second section and a phase angle between the third voltage source and the fourth voltage source to minimize transfer of the electric power along the third section.

2. The method according to claim 1, further comprising:
    an exchange of payment in response to the transferring power from the first vehicle to the second vehicle.

3. A method of providing power from a mobile charger to an electrical vehicle comprising:
    providing a transmission line extending between the mobile charger and the vehicle along a first section and further extending beyond the mobile charger along a second section and beyond the vehicle along a third section; and
    transferring power from the mobile charger to the vehicle along the transmission line such that the mobile charger comprises a first voltage source and a second voltage source and the vehicle comprises a third voltage source and a fourth voltage source, the first, second, third, and fourth voltage sources being operably coupled to the transmission line, the step of transferring power is spatially directed from the mobile charger to the vehicle by choosing a phase angle between the second voltage source of the mobile charger and the third voltage source of the vehicle to facilitate transfer of the electric power along the first section and by choosing a phase angle between the first voltage source and the second voltage source to minimize transfer of the electric power along the second section and a phase angle between the third voltage source and the fourth voltage source to minimize transfer of the electric power along the third section.

4. The method according to claim 3 wherein the mobile charger is selected from the group consisting of vehicles, trucks, and drones.

5. The method according to claim 3, further comprising:
    an exchange of payment in response to the transferring power from the mobile charger to the vehicle.

6. A vehicle-to-vehicle power transfer system for use between a first vehicle and at least a second vehicle, the system comprising:
    an electric power system disposed in each of the first and second vehicles, the electric power system having a pair of transceivers associated with each of the first and second vehicles, the electric power system configured to provide electrical drive power to a vehicle drive system for propulsion of the associated vehicle; and
    a power transfer system having an RF transmission line extending a first section between the first vehicle and the second vehicle and further extending a second section beyond the first vehicle and a third section beyond the second vehicle, the power transfer system configured to transfer electric power from at least the electric power system of the first vehicle to the electric power system of the second vehicle along the RF transmission line using the pair of transceivers of each of the first and second vehicles, the pair of transceivers of the first vehicle being represented by a first voltage source and a second voltage source, the pair of transceivers of the second vehicle being represented by a third voltage source and a fourth voltage source, the first, second, third, and fourth voltage sources operably coupled to the RF transmission line, the power transfer system configured to spatially direct the electric power from the electric power system of the first vehicle to the electric power system of the second vehicle while simultaneously minimizing transfer of the electric power beyond the first vehicle and the second vehicle by choosing a phase angle between the second voltage source of the first vehicle and the third voltage source of the second vehicle to facilitate transfer of the electric power along the first section and by choosing a phase angle between the first voltage source and the second voltage source to minimize transfer of the electric power along the second section and a phase angle between the third voltage source and the fourth voltage source to minimize transfer of the electric power along the third section.

7. The vehicle-to-vehicle power transfer system according to claim 6 wherein the power transfer system is a bi-directional power transfer system configured to transfer electric power from the electric power system of the first vehicle to the electric power system of the second vehicle and further configured to receive electric power from the electric power system of the second vehicle to the electric power system of the first vehicle.

8. The vehicle-to-vehicle power transfer system according to claim 6 wherein the power transfer system is a uni-directional power transfer system configured to transfer electric power from the electric power system of the first vehicle to the electric power system of the second vehicle.

9. The vehicle-to-vehicle power transfer system according to claim 6 wherein the power transfer system is a wireless power transfer system.

10. The vehicle-to-vehicle power transfer system according to claim 6 wherein the power transfer system is a capacitive power transfer system.

11. The vehicle-to-vehicle power transfer system according to claim 6 wherein the power transfer system is an inductive power transfer system.

12. The vehicle-to-vehicle power transfer system according to claim 6 wherein the power transfer system is an electromagnetic power transfer system.

13. The vehicle-to-vehicle power transfer system according to claim 6 wherein the power transfer system comprises a retractable apparatus configured to transfer the electric power from at least the electric power system of the first vehicle to the electric power system of the second vehicle.

14. The vehicle-to-vehicle power transfer system according to claim 13 wherein the retractable apparatus is positioned along a longitudinal direction of the associated vehicle.

15. The vehicle-to-vehicle power transfer system according to claim 13 wherein the retractable apparatus is fixedly connectable between the first vehicle and the second vehicle.

16. The vehicle-to-vehicle power transfer system according to claim 6, further comprising:
   an electric power system disposed in a third vehicle, the electric power system configured to provide electrical drive power to the third vehicle drive system for propulsion of the third vehicle; and
   a second power transfer system configured to transfer electric power between the third vehicle and at least one of the electric power systems of the first and second vehicles.

17. The vehicle-to-vehicle power transfer system according to claim 6 wherein the power transfer system is affixed to a roadway surface.

18. The vehicle-to-vehicle power transfer system according to claim 17 wherein the power transfer system is a coating upon the roadway surface.

19. The vehicle-to-vehicle power transfer system according to claim 6 wherein the power transfer system is embedded in a roadway surface.

* * * * *